(12) United States Patent
Neter

(10) Patent No.: US 6,461,556 B2
(45) Date of Patent: *Oct. 8, 2002

(54) POST-MOLD COOLING METHOD AND APPARATUS

(75) Inventor: Witold Neter, Newnan, GA (US)

(73) Assignee: Husky Injection Molding Systems, Ltd., Bolton (CA)

( * ) Notice: Subject to any disclaimer, the term of this patent is extended or adjusted under 35 U.S.C. 154(b) by 92 days.

This patent is subject to a terminal disclaimer.

(21) Appl. No.: 09/741,468

(22) Filed: Dec. 19, 2000

(65) Prior Publication Data

US 2001/0005063 A1 Jun. 28, 2001

Related U.S. Application Data

(63) Continuation-in-part of application No. 09/119,256, filed on Jul. 20, 1998, now Pat. No. 6,171,541.
(60) Provisional application No. 60/080,085, filed on Mar. 31, 1998.

(51) Int. Cl.⁷ ............................................... B29C 45/72
(52) U.S. Cl. .................. 264/237; 264/328.14; 264/336; 264/348; 425/547; 425/556
(58) Field of Search ............................... 264/40.6, 237, 264/328.1, 328.14, 328.15, 328.16, 335, 336, 348, 519; 425/143, 547, 548, 526, 534, 556, 444

(56) References Cited

U.S. PATENT DOCUMENTS

| 4,382,905 A | 5/1983 | Valyi |
| 4,592,719 A | 6/1986 | Bellehache et al. |
| 5,114,327 A | 5/1992 | Williamson et al. |
| 5,176,871 A | 1/1993 | Fukai |
| 5,232,641 A | 8/1993 | Williamson et al. |
| 5,232,715 A | 8/1993 | Fukai |
| 5,338,172 A | 8/1994 | Williamson et al. |
| 5,514,309 A | 5/1996 | Williamson et al. |
| 6,171,541 B1 * | 1/2001 | Neter et al. ............ 264/328.14 |
| 6,223,541 B1 * | 5/2001 | Farrag ....................... 425/526 |

FOREIGN PATENT DOCUMENTS

| EP | 0 947 304 A2 | 10/1999 |
| JP | 7-171888 | 7/1995 |
| JP | 08103948 | 4/1996 |

* cited by examiner

Primary Examiner—Jill L. Heitbrink
(74) Attorney, Agent, or Firm—Katten, Muchin, Zavis & Rosenman

(57) ABSTRACT

The present invention relates to an innovative cooling pin for cooling molded articles, a system which incorporates same, and a method for cooling a molded article which utilizes the cooling pin. The cooling pin of the present invention has a central pin structure with a head portion, a cooling fluid channel within the central pin structure terminating in an outlet in the head portion, and a plurality of fins positioned along the length of the central pin structure. Adjacent ones of the fins are preferably separated by a spacer. Each of the fins is preferably formed from a flexible material such as a flexible plastic material. The fins force and maintain cooling fluid introduced into the interior of the molded article in close proximity to the interior surfaces of the molded article.

40 Claims, 22 Drawing Sheets

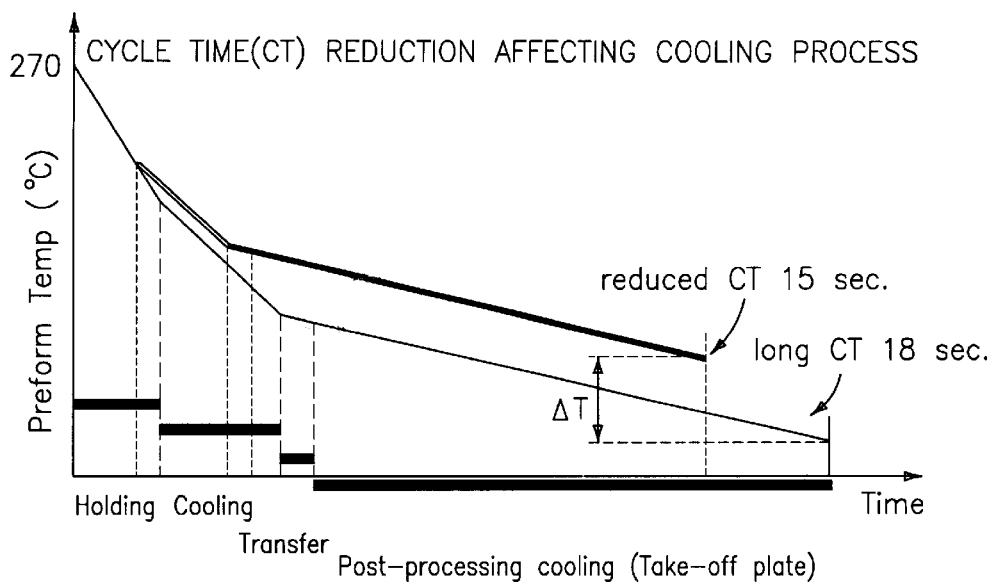
*FIG. 1*
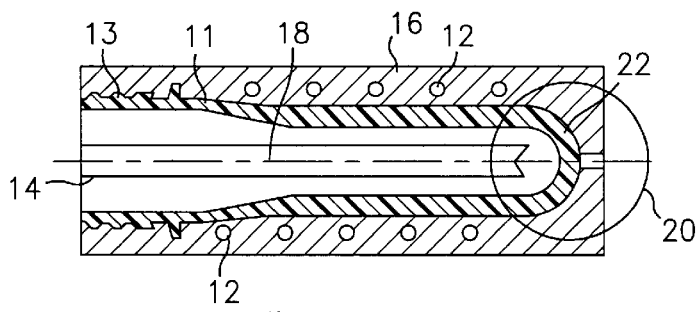
*FIG. 2*
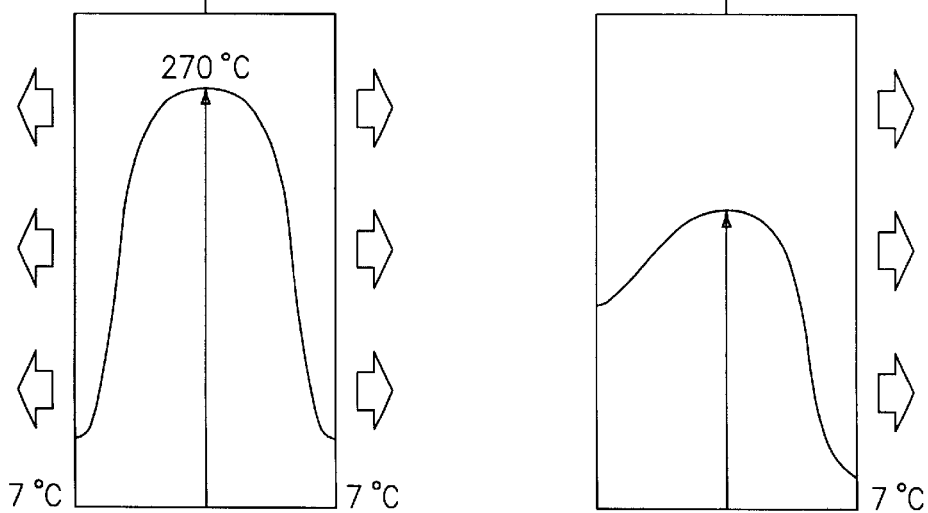
*FIG. 3(a)*     *FIG. 3(b)*

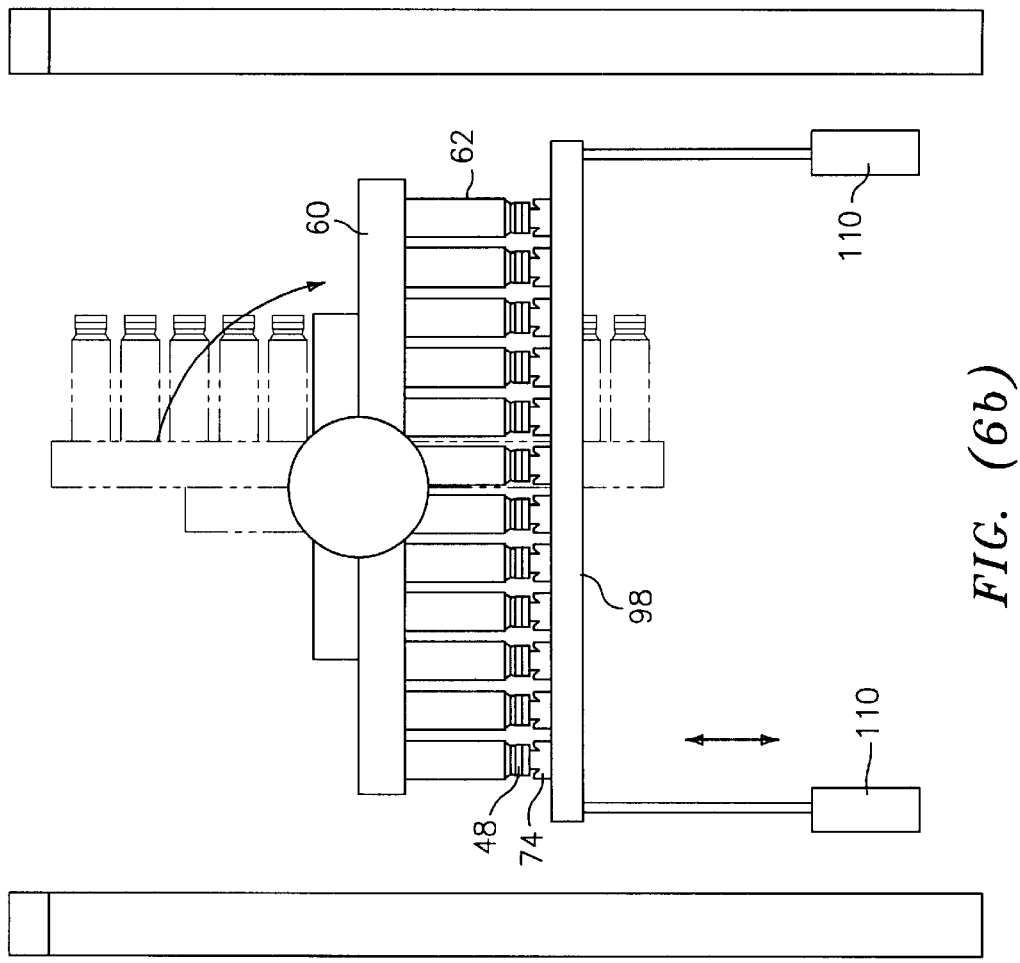
FIG. (6b)
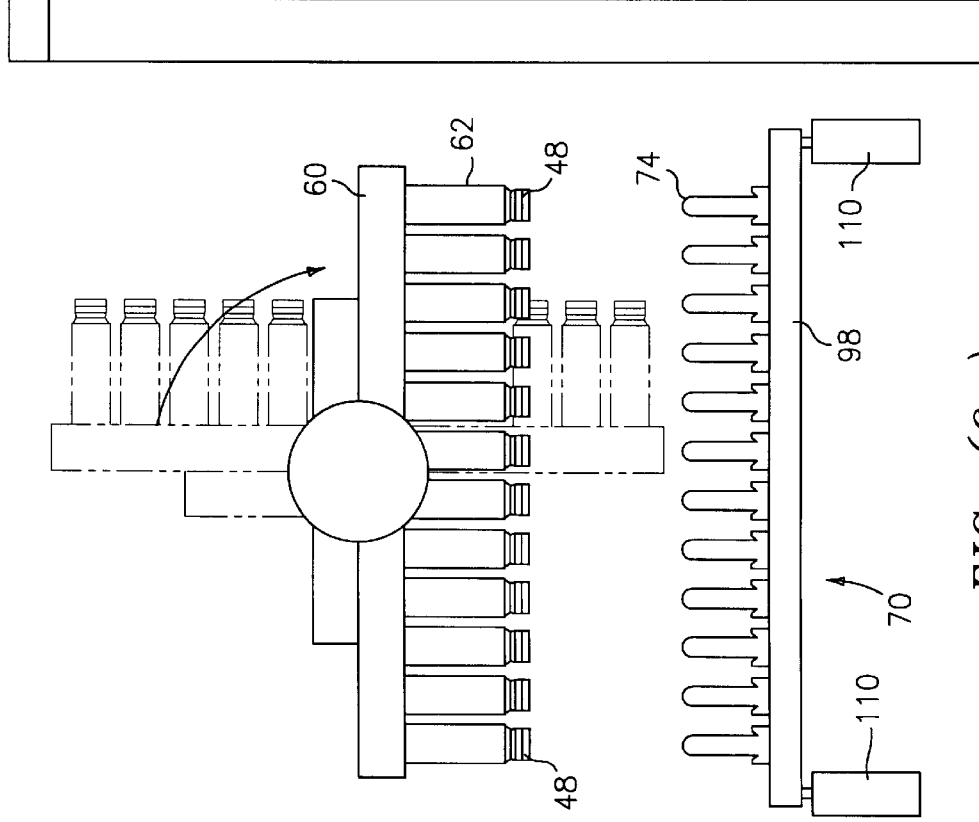
FIG. (6a)

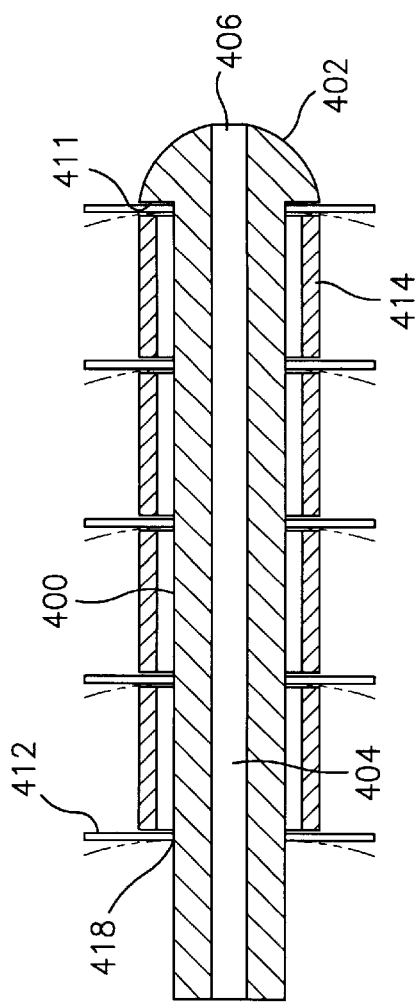
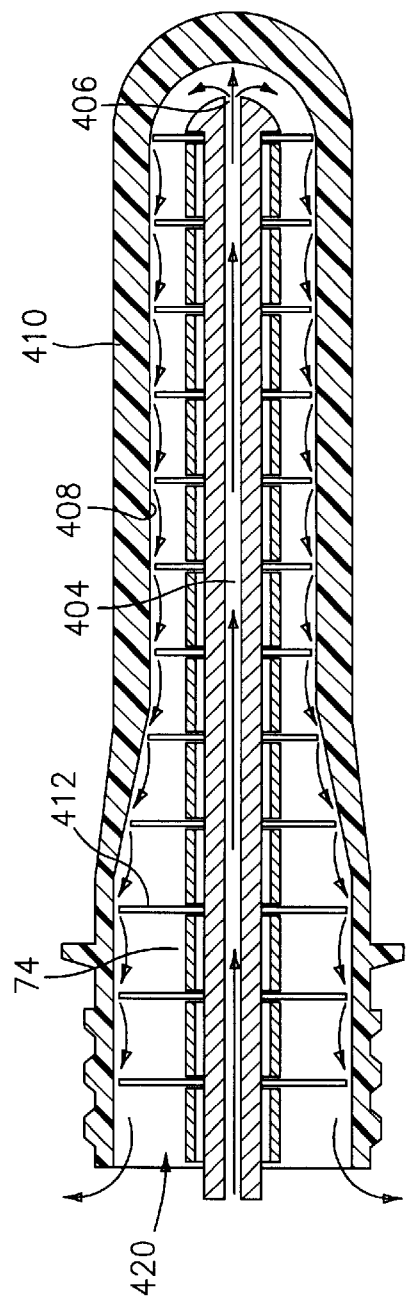
FIG. 9(d)
FIG. 9(e)

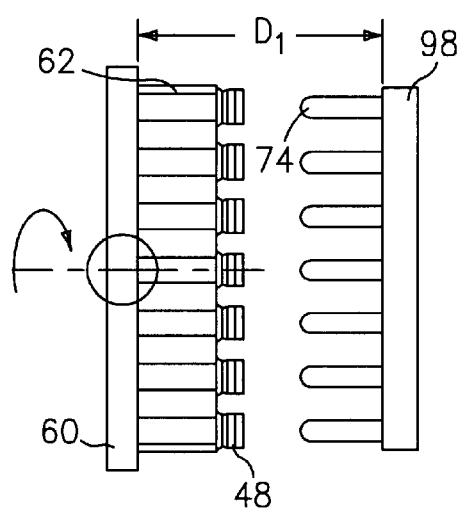
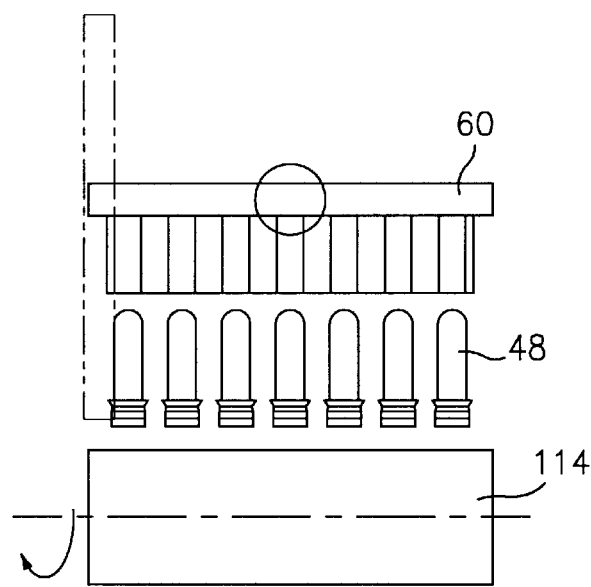
FIG. 13(a)          FIG. 13(b)
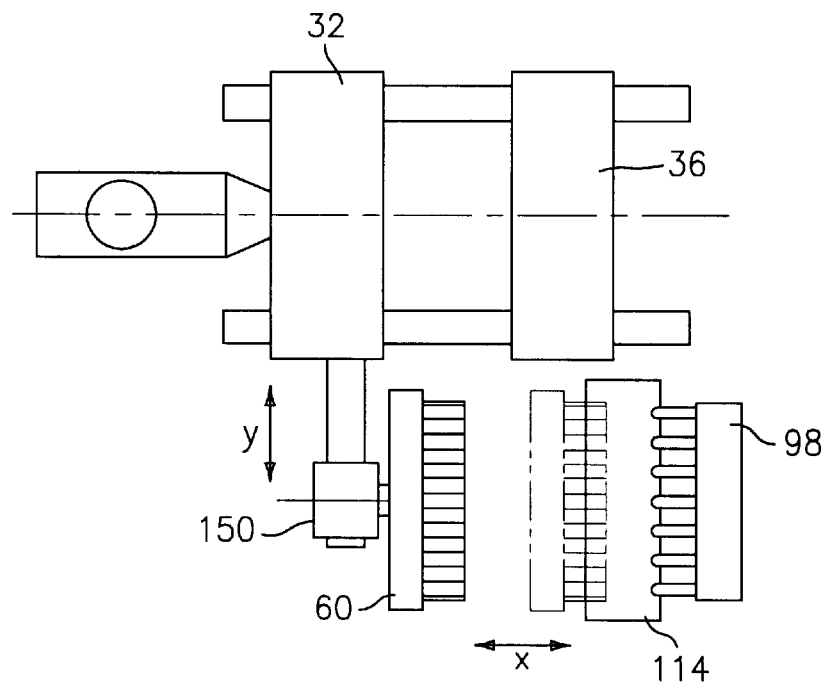
FIG. 14

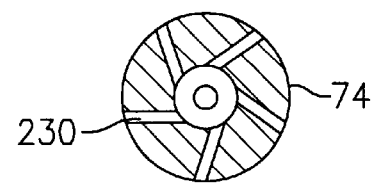
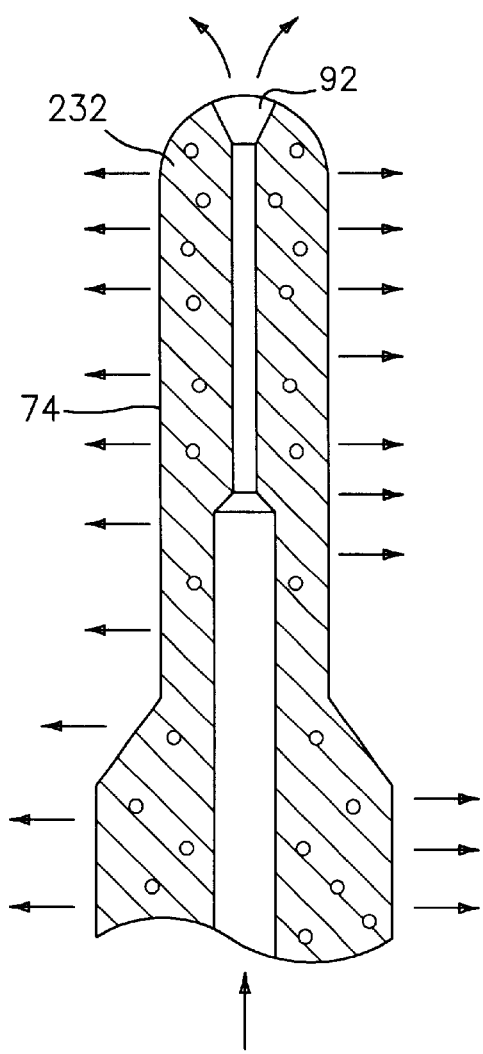
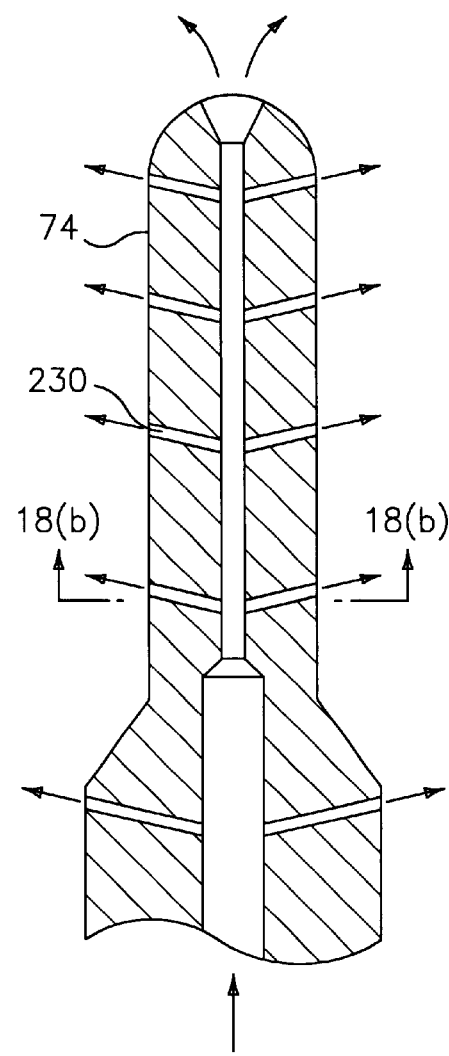
FIG. 18(b)
FIG. 17
FIG. 18(a)

POST-MOLD COOLING METHOD AND APPARATUS

CROSS-REFERENCE TO RELATED APPLICATION

This application is a continuation-in-part of U.S. Ser. No. 09/119,256, filed Jul. 20, 1998 U.S. Pat No. 6,171,541, entitled PREFORM POST-MOLD COOLING METHOD AND APPARATUS, which claims the benefit of U.S. Provisional Application No. 60/080,085 filed Mar. 31, 1998.

BACKGROUND OF THE INVENTION

The present invention relates to a method and apparatus for molding and cooling plastic molded articles such as preforms made of single or multiple materials such as plastic resins. In particular, the invention teaches a rapid injection molding process where the molded articles, such as PET preforms, are ejected from the mold before the cooling step is complete. This is possible as a result of the utilization of a new post-mold cooling process and apparatus where the molded articles are cooled internally by convection heat transfer, after being removed from the mold and retained outside the mold area. The present invention also teaches additional external cooling, done through either convection or conduction heat transfer, which may take place at least partially simultaneously with the internal cooling.

Proper cooling of molded articles represents a very critical aspect of the injection molding process because it affects the quality of the article and impacts the overall injection cycle time. This becomes even more critical in applications where semicrystalline resins are used, such as the injection molding of PET preforms. After injection, the PET resin remains in the mold cavity space for cooling for a sufficient period of time to prevent formation of crystalline portions and to allow the preform to solidify before being ejected.

Two things typically happen if a preform is rapidly ejected from a mold in order to reduce the cycle time of the injection process. The first is that the preform is not uniformly cooled. In most instances, the bottom portion opposed to the mold gate is crystallized. The amount of heat accumulated in the walls of the preforms during the injection process will still be high enough to induce post molding crystallinity especially in the gate area of the preform. The gate area is a very critical spot because cooling of the mold in this portion is not effective enough and also because the resin in the mold cavity space is still in contact with the hot stem of the hot runner injection nozzle. If this area of a preform remains crystalline above a certain size and depth, this will weaken the quality of a blown article. The second is that the preform will be too soft and thus can be deformed during the next handling steps. Another critical area of a preform is the neck finish portion which in many instances has a thicker wall and thus retains more heat than the other portions. This neck portion needs aggressive post-mold cooling to prevent it from becoming crystallized. Also aggressive cooling tends to make the neck solid enough to sustain further manipulations.

Many attempts have been made in the past to improve the cooling efficiency of PET injection molding systems, but they have not resulted in a significant improvement in the quality of the molded preforms or a substantial reduction of the cycle time. Reference is made in this regard to the U.S. Pat. No. 4,382,905 to Valyi which discloses an injection molding method where the molded preform is transferred to a first tempering mold for a first cooling step and then to a second tempering mold for a final cooling step. Both tempering molds are similar to the injection mold and have internal means for cooling their walls that make contact with the preform during the cooling process. Valyi '905 does not teach the provision of cooling devices located on the means for transferring the preforms from the molding area or additional cooling devices that circulate a fluid coolant inside the molded parison.

U.S. Pat. No. 4,592,719 to Bellehache discloses an injection molding method for fabricating PET preforms where molded preforms are removed from the injection cores by a first movable device comprising vacuum sucking devices for holding the preforms and also comprising air absorption (convection) cooling of the outer surface of the preform. A second cooling device is used by Bellehache '719 in conjunction with a second movable device to further cool the inside of the preforms also by air absorption. See FIG. 22 herein. Bellehache '719 does not teach cold air blowing inside a preform which has a significantly higher cooling effect with respect to sucking or absorbing ambient air and also does not teach cooling means by conduction heat transfer located in intimate contact with the preforms wall and air blow means directed to the dome portion of the preforms. Bellehache suffers from a number of deficiencies including less cooling efficiency, less uniformity, longer cooling time, high potential for preform deformation.

U.S. Pat. Nos. 5,176,871 and 5,232,715 show a preform cooling method and apparatus. The molded preform is retained by the injection molding core outside the mold area. The mold core is cooled by a coolant that does not make contact with the molded preform. A cooling tube larger than the preform is placed around the preform to blow cooling air around the preform. The principal problem with the apparatus and method shown in these patents is that the preform is retained in the mold core and this significantly increases the cycle time. Also internal cooling is not achieved by direct contact between coolant and the preform.

Further reference is made to U.S. Pat. Nos. 5,114,327, 5,232,641, 5,338,172, and 5,514,309 that teach a preform internal cooling method using a liquid coolant. Preforms ejected from a mold are transferred to a preform carrier having vacuum means to retain the preforms in place without making contact with the preforms' external wall. The preforms carrier however does not have any cooling devices. Cooling cores are further introduced inside the preforms retained by the carrier and a cooling fluid is blown inside the preforms to cool them. The coolant is further removed by the same vacuum means that retain the preforms from the chamber surrounding the preforms. These patents do not teach blowing cold air inside a preform where the air freely leaves the preform after cooling. These patents also do not teach simultaneous cooling of the preforms internally and externally or a preform carrier having cooling means. See FIG. 21 shown herein.

Further reference is made to Japanese Pat. Discl. 7-171888 which teaches a preform cooling apparatus and method. A molded preforms robot carrier is used to transfer the preforms to a cooling station. The robot includes external cooling of the preforms walls by conduction thermal transfer using a water coolant. The cooling station comprises a first movable transfer robot that has a rotary hand portion including vacuum means for holding the preforms and also external cooling of the preforms walls by conduction thermal transfer. The molded preforms are transferred from the robot carrier to the hand portion. The hand portion is moved from position A to position B where it is rotated by 90° in order to transfer the preforms (cooled so fat only at the exterior) to a cooling tool. The cooling tool has means to hold the performs, devices to cool the inside of the preforms by blowing air and devices to cool the outside of the preforms by either blowing air or water cooling. The internal cooling which is employed is shown in FIGS. 19 and 20 herein. This patent does not teach a cooling method where internal and external cooling are performed as soon as possible from the moment the preforms are ejected from the mold and into a carrier plate. It also does not teach simultaneous internal and external cooling of the preforms while they are retained by the movable robot carrier. Therefore, this cooling method is not fast enough and does not prevent crystallinity formation outside the mold.

FIGS. 19 and 20 show known methods of internally cooling preforms where a cooling device is located outside the preform and is used to blow cool air inside the preform. Because the air nozzle is located outside the preform, the incoming cold air flow will inevitably interfere and mix at least partially with the outcoming warm flow. This will significantly reduce the cooling efficiency. If the cooling device is on the same axis with the preform, the approach of FIG. 19 is ineffective because there is no air circulation in the preform. If the cooling device is laterally shifted as in FIG. 20, internal air circulation is achieved, but this is still ineffective because one side of the preform is better and faster cooled than the other. The coolant has a quasi-divergent flow profile with a non-symmetrical profile. This profile is very ineffective and it does not allow to concentrate the cooling fluid/gas towards the sprue gate or dome portion.

SUMMARY OF THE INVENTION

It is an object of the present invention to provide an improved cooling pin for use in a post-molding cooling operation.

It is another object of the present invention to provide a method and apparatus for producing molded articles which have improved cooling efficiency.

It is a further object of the present invention to provide a method and apparatus as above which produce molded articles having improved quality.

It is yet another object of the present invention to provide a method and apparatus as above which reduce overall cycle time.

The foregoing objects are obtained by the present invention.

In accordance with the present invention, an innovative cooling pin for cooling molded articles is presented. The cooling pin comprises a central pin structure terminating in a head portion, a fluid channel passing through the central pin structure and terminating in an outlet in the head portion, and a plurality of fins positioned along the central pin structure. Each of the fins is preferably formed from a flexible material and is preferably an annular structure surrounding an exterior portion of the central pin structure. The fins are preferably separated by spacers. The fins may have different lengths or diameters to conform with the interior shape of the molded article. The flexible fins serve to take care of small misalignments and improve interior cooling of the molded article by forcing a cooling fluid introduced into the interior of the molded article via the fluid channel to flow close to the internal surface of the molded article.

One system for cooling a plurality of molded articles formed by a mold comprises a take-out plate or carrier having a plurality of receptacles for removing molded articles from between the mold halves of a mold and transporting them to a cooling position and a frame having a plurality of the above-mentioned cooling pins mounted thereto. In operation, the cooling pins are inserted into the interiors of the freshly molded articles when the carrier has reached a cooling position. Insertion of the cooling pins into the molded articles occurs by moving the frame with the cooling pins relative to the carrier. Preferably, each cooling pin is inserted deeply within a molded article so that a cooling fluid exiting from the fluid channel in the cooling pin impinges directly onto the dome or sprue gate portion of the molded article. In this way, crystallinity may be substantially avoided in the dome or sprue gate portion. As mentioned before, the fins on each cooling pin serve to keep the cooling fluid in close proximity to the interior surface of the molded article.

A method for cooling a molded article is also described herein. The method broadly comprises providing a cooling pin having a central pin structure with an internal fluid channel having an outlet in a head portion of the central pin structure and a plurality of external fins, inserting the cooling pin into the interior of the molded article so that the head portion is in close proximity to the dome portion of the molded article and the outer edge of each fin is in close proximity to an internal surface of the molded article, flowing a cooling fluid through the internal fluid channel and expelling the fluid out of the outlet onto the dome portion of the molded article, and forcing the cooling fluid into close proximity to the internal surface of the molded article with the fins.

As used herein, the terms "take-off plate", "take-out plate" and "end of arm tool" are used interchangeably and refer to the same structures).

Other details of the cooling pin, system, and method of the present invention, as well as other objects and advantages attendant thereto, are set forth in the following detailed description and the accompanying drawings in which like reference numerals depict like elements.

BRIEF DESCRIPTION OF THE DRAWINGS

FIG. 1 is a graph showing the molded article temperature vs. time during and after the injection step;

FIG. 2 is a schematic representation of a molded article in the mold;

FIGS. 3(a) and 3(b) show the temperature gradient across the walls of a molded article during cooling;

FIGS. 6(a) and 6(b) are side views showing an embodiment of the present invention including a robot take-off-plate (or end of arm tool, EOAT) and a frame holding cooling pins;

FIGS. 9(c)–9(e) illustrate an innovative cooling pin for use in cooling molded performs.

FIGS. 13(a) and 13(b) are side views of another embodiment of the cooling system of the present invention;

FIG. 14 is a top view of an injection molding system having another embodiment of the cooling system of the present invention;

FIG. 17 illustrates the construction of an alternative cooling pin in accordance with the present invention;

FIGS. 18(a) and (b) illustrate the construction of yet another alternative cooling pin in accordance with the present invention;

DETAILED DESCRIPTION OF THE INVENTION

Figure 3C:
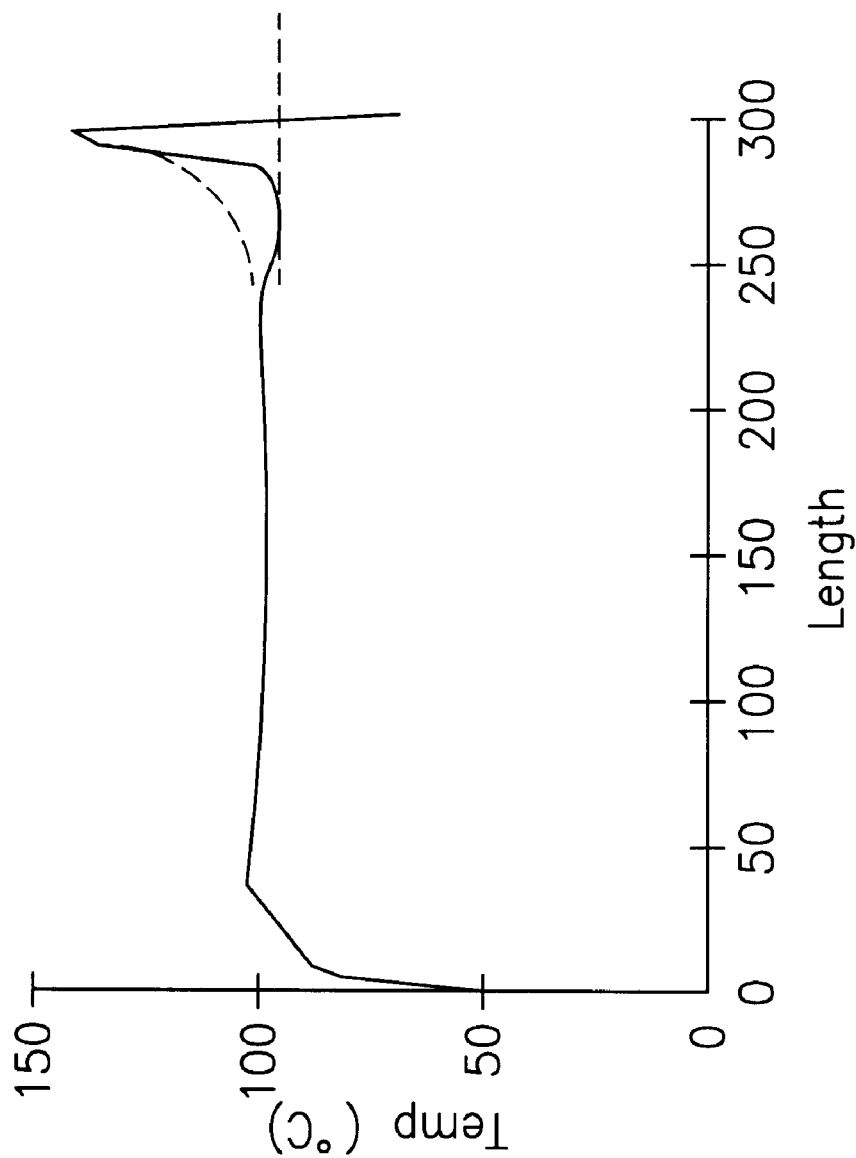
FIG. 3c shows the temperature profile along the molded article walls.

Referring now to the drawings, FIG. 1 is a graph showing the evolution of molded article temperature vs. time during and after the injection step. FIG. 2 is a schematic representation of a molded article while it is in the mold. As can be seen from this figure, cooling while in the mold is typically effected by cooling tubes 12 and 14 positioned within the mold cavity 16 and the mold core portions 18 respectively. As a result, cooling is effected from both sides of the molded article 11. Further, as shown in FIG. 2, the mold cavity plate 16 typically has a gate region 20 at which the bottom part or the dome portion 22 of the molded article 11 is formed. The molded article has a neck finish portion 13 which sometimes has a thick wall which is difficult to cool to prevent crystallinity.

FIGS. 3(a) and 3(b) show the temperature gradient across the walls of a molded article during cooling. FIG. 3(a) shows the temperature gradient inside the mold, while FIG. 3(b) shows the temperature gradient outside the mold. FIG. 3(c) shows the temperature profile along the molded article walls. The temperature spike represents the temperature in the dome or sprue gate portion of the molded article.

Figure 4:
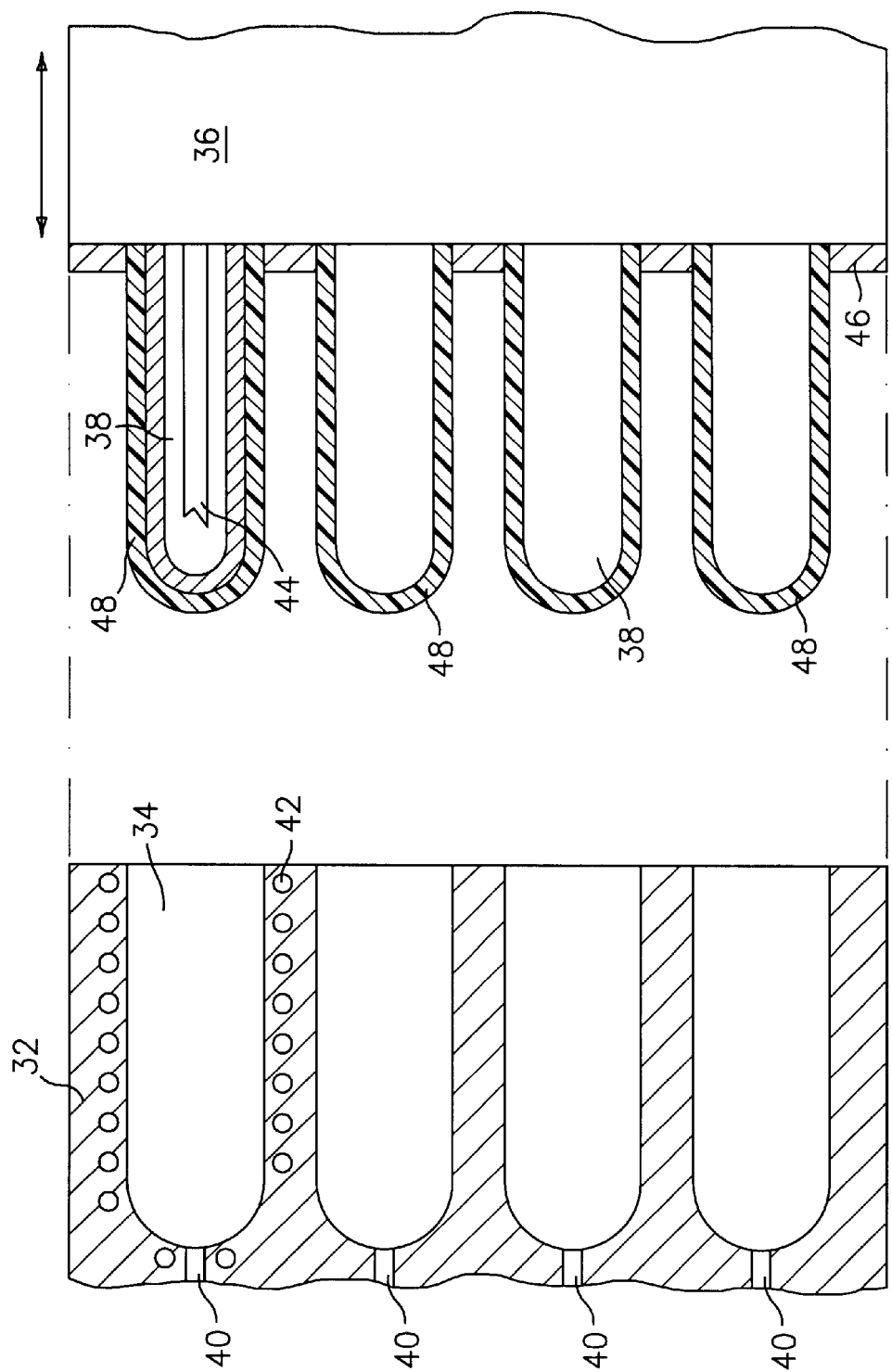
FIG. 4 is a sectional view showing a prior art injection mold.

Referring now to FIG. 4, an injection mold is provided which includes a stationary mold half or plate 32 having an array of mold cavities 34 and a movable mold half or plate 36 having an array of mold cores 38. The mold cavity plate 32 is in fluid communication with a manifold plate (not shown) that receives molten material from an injection unit (not shown) of an injection molding machine. The mold cavities 34 receive the molten material from hot runner nozzles (not shown), such as for example a valve gated nozzle (not shown), through mold cavity gates 40. The mold cavities are each surrounded by cooling means 42 for cooling the molten material in the cavity space formed by the mold core 38 and the mold cavity 34 when the mold plates 32 and 36 are in a mold closed position. The cooling means 42 are preferably formed by cooling channels embedded within the mold plate 32 for conducting a cooling fluid. As previously discussed, the mold cores 38 and the mold cavities 34 form in the mold closed position a plurality of mold cavity spaces (not shown) that are filled with molten material through the mold gates 40 during the injection step. The mold cores 38 also include means 44 for cooling the molten material in the cavity space. The cooling means 44 preferably comprise a cooling tube within each mold core. The mold core plate 36 further includes an ejector plate 46 which is used to remove the molded articles 48 from the mold cores 38. The operation of the ejector plate 46 is well known in the prior art and does not form part of the present invention. In fact, the ejector plate 46 may comprise any suitable ejector plate known in the art.

According to the current invention, any molten plastic, metal or ceramic material can be injected into the mold cavity space and cooled into a desired article using the mold system of FIG. 4. In one embodiment of the current invention, the molten material is PET and the molded article is a preform. According to the present invention however, the molded article can also be a preform made of more than one material, such as for example virgin PET, recycled PET and an appropriate barrier material such as for example EVOH.

As is known in the art, an article, such as a preform, is molded by closing the mold, injecting the molten material into the cavity space, initiating cooling of the cavity space, filling the cavity space, holding the molten material under pressure, performing final in-mold cooling, opening the mold, ejecting the solidified articles from the cores and transferring the articles to a take-off plate.

According to the present invention, in order to reduce the overall cycle time, the residence time of the article in the mold has to be minimal so that the mold is able to produce batches of articles as fast as possible. The problem with a reduced residence time in the mold is that the cooling time has to be reduced, but in such a manner that the molded articles are solid enough to withstand all the subsequent handling steps without deformation. A reduced cooling time is a problematic option because the articles are not sufficiently and uniformly cooled by the cooling means 42 and 44. The amount of heat retained by the article after being cooled inside the mold for a reduced time and immediately after opening the mold is very significant and depends on the thickness of the molded article. This internal heat has the potential to generate crystallized portions at the sprue gate area or dome portion of the molded article, the neck finish portion of the molded article, or the entire article. In order to prevent the crystallization of the molded article, a very aggressive cooling method has to be used. During cooling, attention must be paid so as to control the shrinkage of the molded articles which can adversely affect their final dimensions.

Figure 5:
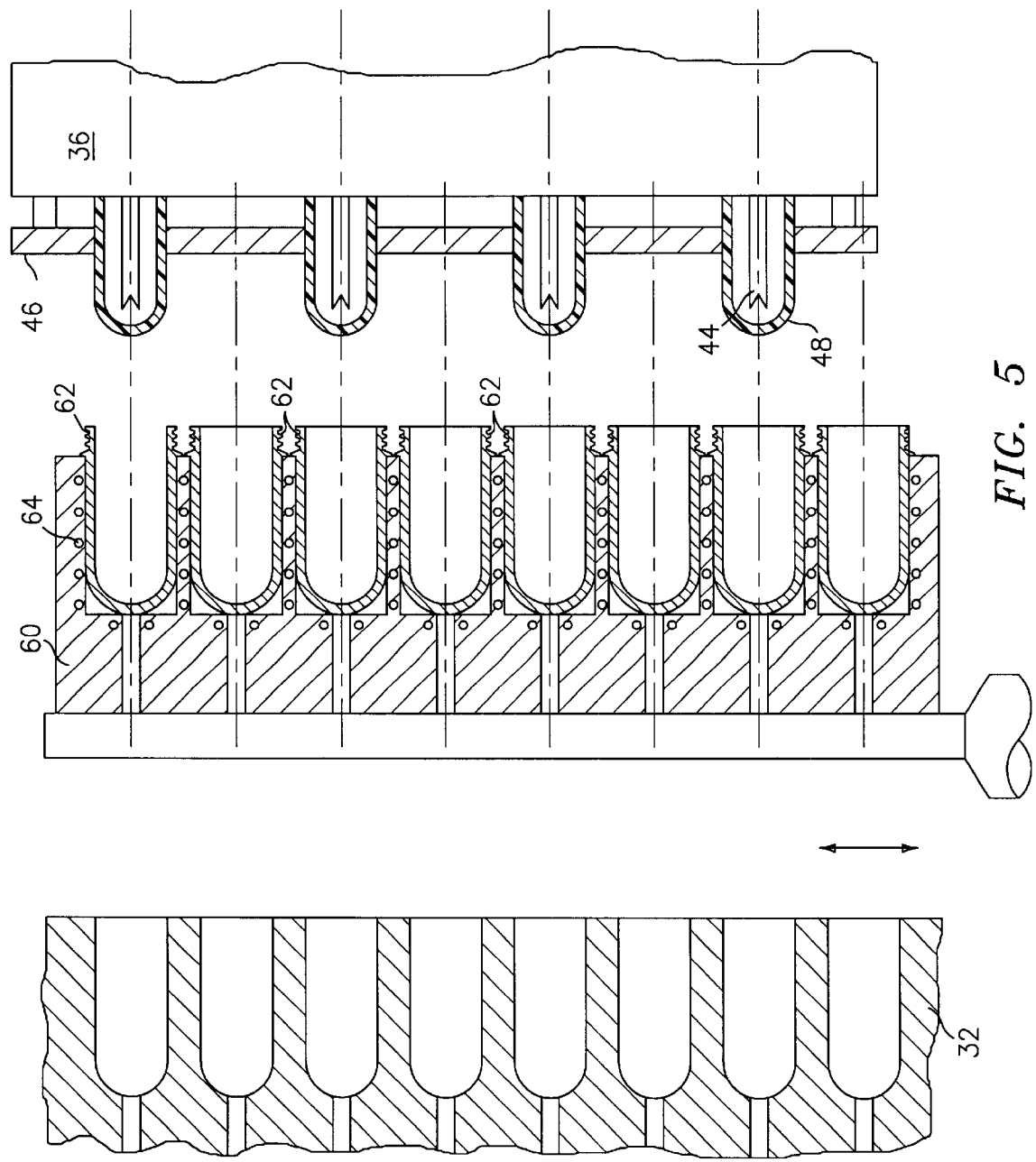
FIG. 5 is a sectional view showing a movable robot including an end-of-arm-tool (EOAT) device placed in the molding area between the stationary and movable mold plates.

FIG. 5 illustrates one embodiment of a robot take-off plate 60 which can be used in the cooling method of the present invention. The take-off plate 60 includes a plurality of hollow holders or receptacles 62 which can be water cooled tubes. Typical take-off plates which may be used for the take-off plate 60 are shown in U.S. Pat. No. 5,447,426 to Gessner et al. and in U.S. Reissue Pat. No. RE 33,237 to Delfer, III, both of which are incorporated by reference herein. In operation, the mouth of a plurality of holders 62 are aligned with the mold cores 38 of the mold plate 36. Transfer of the molded articles 48 to the holders 62 is effected by operation of the ejector plate 46. According to the present invention, the take-off plate 60 can be provided with a number of holders 62 equal to the number of mold cores 38 or a larger number of holders 62 such as a multiple of the number of mold cores, for example three or four times the number of mold cores. By having more holders 62 than the number of cores 38, it is possible to retain some of the molded articles for a time longer that a single molding cycle and thereby increase the cooling time while maintaining a high output of molded articles. The method of the present invention can be carried out irrespective of the relative number of molded articles retained by the holders 62. Nevertheless, in the preferred embodiment of the invention, the robot take-off plate 60 has a number of holders 62 which represent three times the number of cores 38. This means that the take-off plate 60 does not always carry a number of molded articles equal to the number of holders 62. This also means that a single batch of molded articles can be moved back more than once into the mold area between the mold core and cavity plates to pick up other batches of molded articles, while being cooled by intimate contact between the hollow tubes 64 within the take-off plate, which tubes 64 carry a cooling liquid such as water, and the external wall of the molded articles as shown in,more detail in the aforementioned U.S. Pat. No. 5,447,426. The heat transfer between the tubes 64 and the hot molded articles released from the mold is performed through conduction. More particularly, any solid material incorporating any cooling means can be used and brought into intimate contact with the exterior wall of the molded articles to cool the molded articles. By using a cooling system based on heat transfer through conduction implemented through an intimate contact between the molded article and the cooling means, the shape of the article is maintained without deformations or scratches caused by handling.

If desired, the conductive cooling means 64 employed in the take-off plate can be replaced by a convective heat transfer means. Any suitable convective heat transfer means known in the art may be used with the take-off plate 60 to effect cooling of the exterior surfaces of the molded articles carried by the take-off plate 60.

Referring now to FIGS. 6(a) and 6(b), an additional cooling device 70 is used in conjunction with the robot take-off plate 60 to enhance the post-mold cooling efficiency by allowing simultaneous cooling of the interior and exterior surfaces of the molded articles by convective heat transfer and thus reduce the cycle time and improve the quality of the molded articles. The additional cooling device 70 includes an array of elongated cooling pins 74 whose role is to deliver a cooling fluid inside the molded articles held by the take-off plate 60. In a preferred embodiment of the present invention, the cooling fluid is mostly directed and delivered directly into the dome (sprue gate) portion 22 of the molded article, which portion has the highest chance to become crystalline due to the reduction of the cooling time in the mold. The cooling fluid is introduced so as to create an annular flow pattern. According to the present invention, the cooling fluid could be any appropriate coolant, such as for example a liquid or a gas. In a preferred embodiment of the present invention, the cooling fluid is pressurized air delivered through a channel 90 located inside the cooling pin 74. This aspect of the present invention is shown in more detail in FIG. 9(a).

Figure 9C:
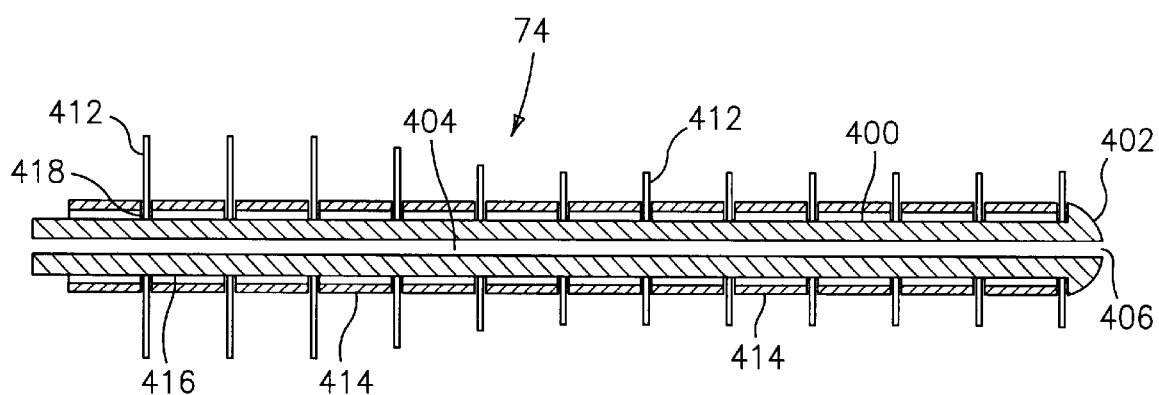
Figure 9A:
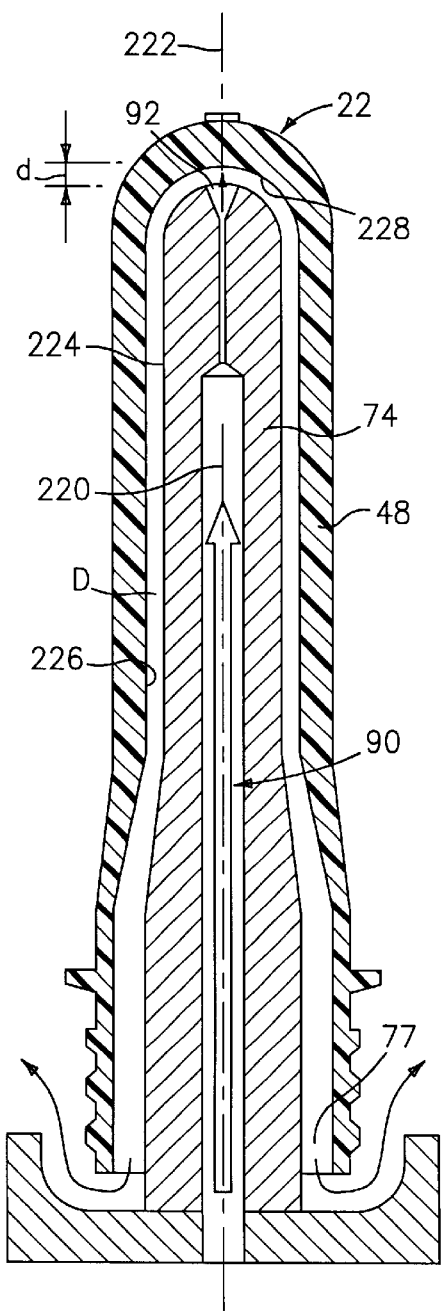
FIGS. 9(a) and 9(b) illustrate a more detailed view of the cooling pins according to two embodiments of the present invention.

FIG. 9(a) illustrates a cooling pin 74 in accordance with the present invention positioned within a molded article 48 being cooled. In order to create an optimum flow of the cooling agent, the cooling pin 74 is introduced deep inside the molded article 48 so that the coolant can reach the dome or sprue gate portion 22. More than that, the cooling pin 74 acts as an additional cooling core. The cooling pin 74 also contributes to the creation of an annular flow pattern which has a higher cooling potential than other cooling flow patterns. Also by using the novel cooling pin 74, the incoming blown cold air and outcoming warm air are completely separated and thus prevents mixing of the two.

As shown in FIG. 9(a), the cooling pin 74 is positioned centrally within the molded article, preferably so that the central axis 220 of the cooling pin 74 is aligned with the central axis 222 of the molded article. As can be seen from this figure, the outer wall 224 of the cooling pin 74 in an upper. region UP is spaced from the inner wall 226 of the molded article by a distance D. Additionally, the outlet nozzle 92 of the cooling pin 74 is spaced from the inner wall 228 of the dome portion 22 by a distance d. In order to create the desired annular flow pattern of cooling fluid, it is preferred that the ratio of d:D be within the range of about 1:1 to about 10:1. It is also highly desirable that the outlet nozzle 92 of the cooling pin be formed by a divergent nozzle construction. While it is preferred to use a divergent nozzle for the outlet 92, it is possible to form the outlet 92 from a straight walled nozzle construction.

Because cooling pin 74 goes deep inside the molded article and behaves like a cooling core as well, the pattern of outcoming warm air that freely escapes from the molded article has an annular shape.

Referring now to FIGS. 9(c)–9(e), a particularly innovative and preferred construction for a cooling pin 74 is illustrated. As shown therein, the cooling pin 74 has a one-piece central pin structure 400 which terminates in a head portion 402. A cooling fluid channel 404 passes through the central pin structure 400 and terminates in an outlet nozzle 406. The outlet nozzle. 406 may have straight edges as shown in FIGS. 9(c)–9(e) or may be a divergent outlet nozzle. Fluid channel 404 may communicate with a fluid source, such as a source of air or some other cooling fluid, via any suitable means known in the art.

In order to keep fluid introduced into a molded article via channel 404 and nozzle 406 in close proximity to the internal surfaces 408 of a molded article 410, a plurality of fins 412 are positioned along the length of the central pin structure 400 with a first one of the fins 412 positioned in close proximity to an undercut surface 411 of the head portion 402 of the cooling pin. As shown in FIGS. 9(c)–9(e), adjacent fins 412 are separated by a spacer 414. Each spacer 414 may be formed by a thin wall bushing positioned over a portion of the exterior surface 416 of the central pin structure.

The fins 412 may be formed from any suitable flexible metallic or non-metallic material known in the art. For example, the fins 412 may each be formed from TEFLON or another plastic material. Each fin 412 may comprise an annular ring of flexible material having a central hole 418 with a diameter which allows the fin 412 to be slid along the exterior surface 416 of the central pin structure 400 until a desired position is reached. As shown in FIGS. 9(c)–9(e), some of the fins 412 may have a diameter larger than that of other fins 412. This is to allow the fin assembly on the cooling pin 74 to conform to the internal shape of the molded article.

In operation, as shown in FIG. 9(e), the cooling pin 74 is inserted deeply within the molded article 410 being cooled so that cooling fluid exiting from the outlet 406 impinges directly on the dome portion of the molded article 410. The cooling pin 74 is preferably introduced into the molded article 410 so that the central axis of the cooling pin 74 is aligned with the central axis of the molded article 410. By introducing the cooling pin 74 into the molded article 410 in this manner, an annular flow of cooling fluid can be created in the molded article 410. As the cooling fluid flows along the internal surfaces 408 of the molded article 410, the flexible fins 412 force the cooling fluid, and maintain the cooling fluid, in close contact with the internal surfaces 408. The cooling fluid exits the interior of the molded article through outlet 420 and preferably flows into the ambient atmosphere.

The use of a cooling pin 74 with flexible fins 412 provides a number of advantages. First, and most importantly, the flexible fins 412 on the cooling. pin 74 help maintain the cooling fluid flowing through the molded article 410 in close proximity to the interior surfaces 408 of the molded article 410, thereby improving the cooling of the molded article. This is because the flexible fins 412 close the gap between the interior surfaces 408 of the molded article 410 and the cooling pin 74, forcing the cooling fluid to flow close to the molded article internal surfaces 408. As a result, the cooling fluid flow will create a cushion between the molded article 410 and the cooling pin 74 and remove heat from the interior surfaces 408 more effectively. Second, the flexible fins 412 take care of small misalignments between the cooling pin 74 and the molded article 410. Third, it allows the use of a cooling pin which has a constant length and a constant diameter central pin structure to cool a wide variety of molded articles. By using fins 412, only the size of the fins 412 will change for different molded articles. Fourth, one can change the cooling effect in a particular area of the molded article, by increasing or decreasing the number of fins 412 as needed.

If desired, undercuts or notches (not shown) can be provided in the surface of the central pin structure 400 to receive interior portions of the fins 412 and thereby provide support for the fins 412 in certain fixed locations.

If desired, the spacers 414 may be omitted. For examples, an O-ring (not shown) may be positioned adjacent each side of each flexible fin 412 to hold it in place. Each O-ring may be formed from any suitable material known in the art such as a rubber material.

While the fins 412 have been described as being annular ring structures, for certain molded article shapes, the fins 412 may be formed from non-annular structures if necessary. For example, a rectangular fin construction may be used where the molded article being molded has a rectangular or non-circular internal cross sectional shape.

If desired, the fins 412 may be formed integrally with the central pin structure 400. In such instances, additional cooling effects may be created as desired by placing additional fins around the exterior surface of the cooling pin 74 between fixed fins 412.

Figures 8A, 8B, 8C, 8D:
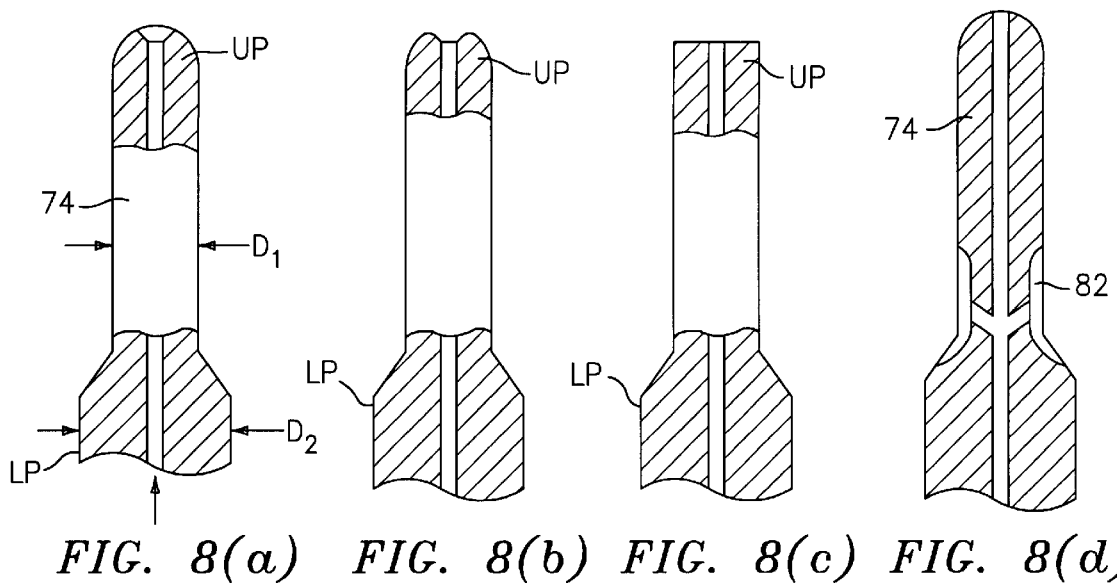
FIGS. 8(a)–(h) shows several cooling pin designs according to the present invention.
Figures 8E, 8F, 8G:
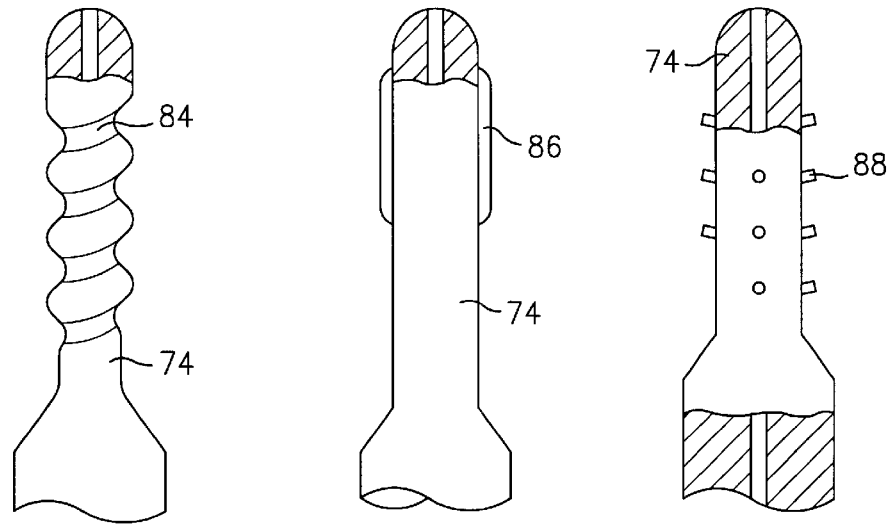
Figures 11A, 11B:
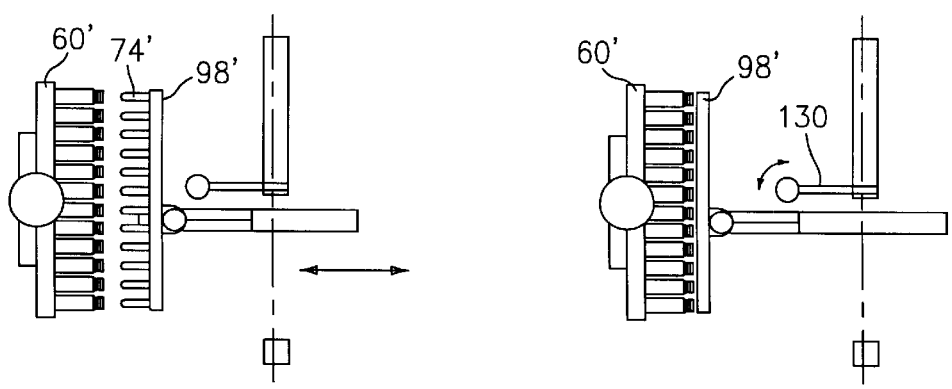
FIGS. 11(a)–11(l) show another embodiment of the frame and cooling pins according to the present invention.
Figure 8H:
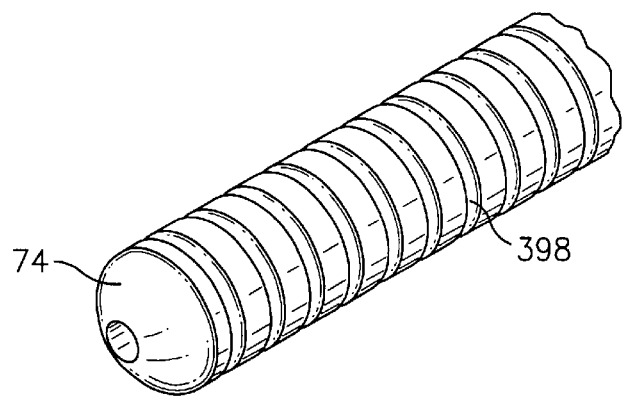

While a preferred construction for the cooling pin has been shown in FIGS. 9(c)–9(e), as shown in FIGS. 8(a) through 8(h), 17 and 18, the cooling pins 74 can have various sizes and shapes to achieve various cooling effects. For example, as shown in FIG. 8(a), the lower portion LP of the cooling pin may have a diameter $D_2$ which is different from the diameter $D_1$ of an upper portion UP of the pin. As shown in FIGS. 8(a) through 8(c), the upper portion UP of the pins may have different shapes. Referring to FIG. 8(d), the cooling pin 74 may have lateral outlets 82 for discharging a cooling fluid onto side walls of the molded article where crystallinity may occur. As shown in FIG. 8(e), the cooling pin 74 could have helical grooves 84 to obtain specialized cooling effects. Similarly in FIGS. 8(f) and 8(g), the cooling pin 74 could have a plurality of ribs 86 spaced about its periphery or a plurality of contact elements 88. Referring now to FIG. 8(h), the cooling pin 74 could have a plurality of undercuts 398 formed into and along its exterior surface.

FIGS. 18a and 18b illustrate a cooling pin 74 having a plurality of radial conduits 230 for delivering coolant on areas of the molded article other than the dome portion 22 such as the neck finish portion or the body portion. The radial conduits 230 may be spaced along the length of the cooling pin so as to direct coolant against particular areas of a molded article 48.

The cooling pins 74 can be made from any suitably thermally conductive or thermally insulative material. If desired, as shown in FIG. 17, the cooling pin 74 may be made from a porous material 232, such as porous aluminum, so that additional coolant can be spread in a very uniform manner on areas of a molded article other than the dome or sprue gate portion 22.

In a preferred aspect of the present invention, the design of the cooling pin 74 is intended to concentrate maximum cooling at the sprue gate or dome portion 22 of the molded article 48 and thus aggressively focus the cooling fluid to cool this region. In this way, molded articles such as preforms free of crystallized areas in the sprue gate or dome portion 22 can be formed.

Figure 9B:
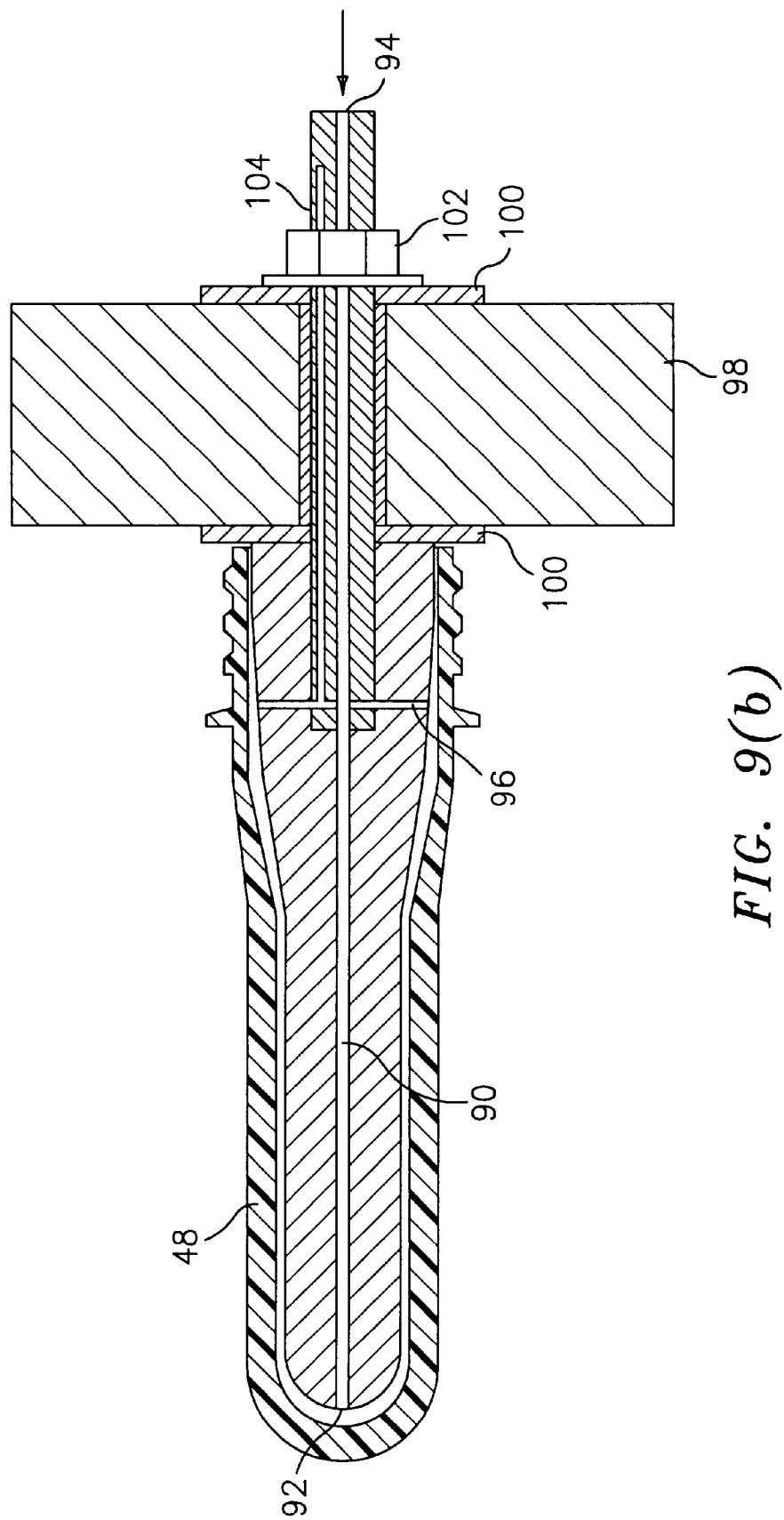

An alternative pin construction with a cold air blowing system which can be used in the apparatus of the present invention is illustrated in FIG. 9(b). As shown therein, the pin 74 has a cold air blowing channel 90 having an outlet 92 for directing cold air against the interior surfaces of the molded article 48, preferably the dome or sprue gate portion 22 of the molded article. The channel 90 communicates with a source of cold air (not shown) via the inlet 94. The cooling pin 74 is further provided with a vacuum channel 96 for removing the cooling air from the interior of the molded article 48. The vacuum channel 96 may be connected to any desired vacuum source (not shown). As can be seen in FIG. 9(b), the cooling pin 74 is mounted on a portion of a frame 98 by sliding pads 100, which are used for pin self-alignment, and a fastening means such as nut 102. The nut 102 can be secured to the element 104 which has an exterior threaded portion (not shown).

Figure 6C:
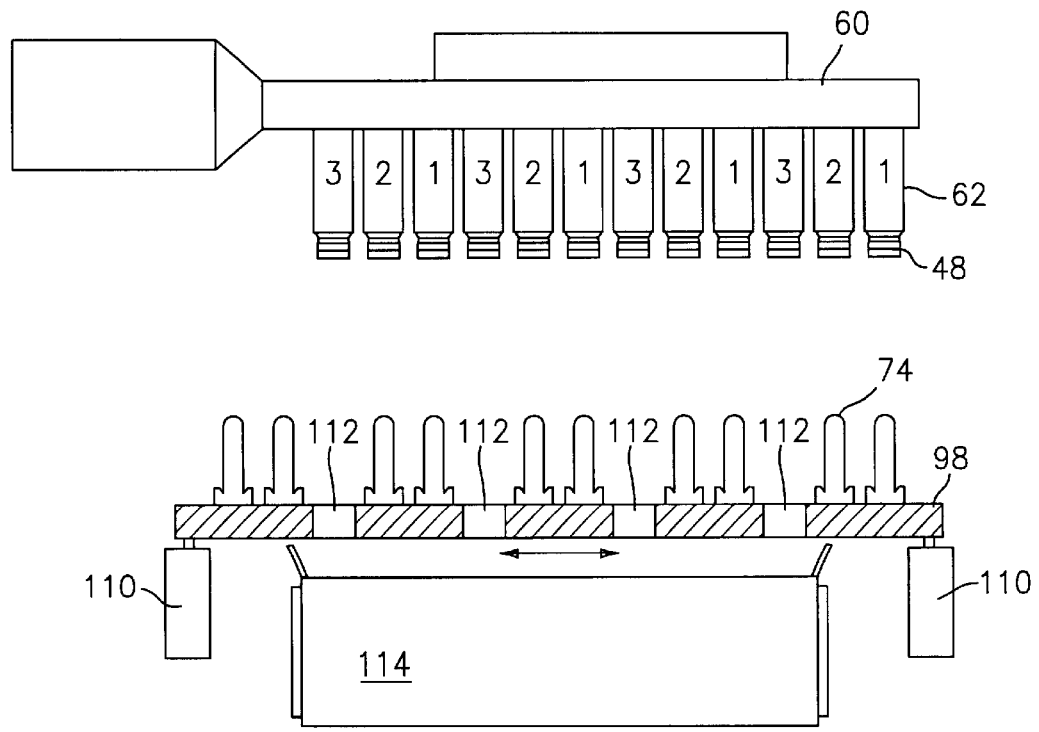
FIGS. 6(c) and 6(d) are front views of the embodiment of FIGS. 6(a) and 6(b)
Figure 6D:
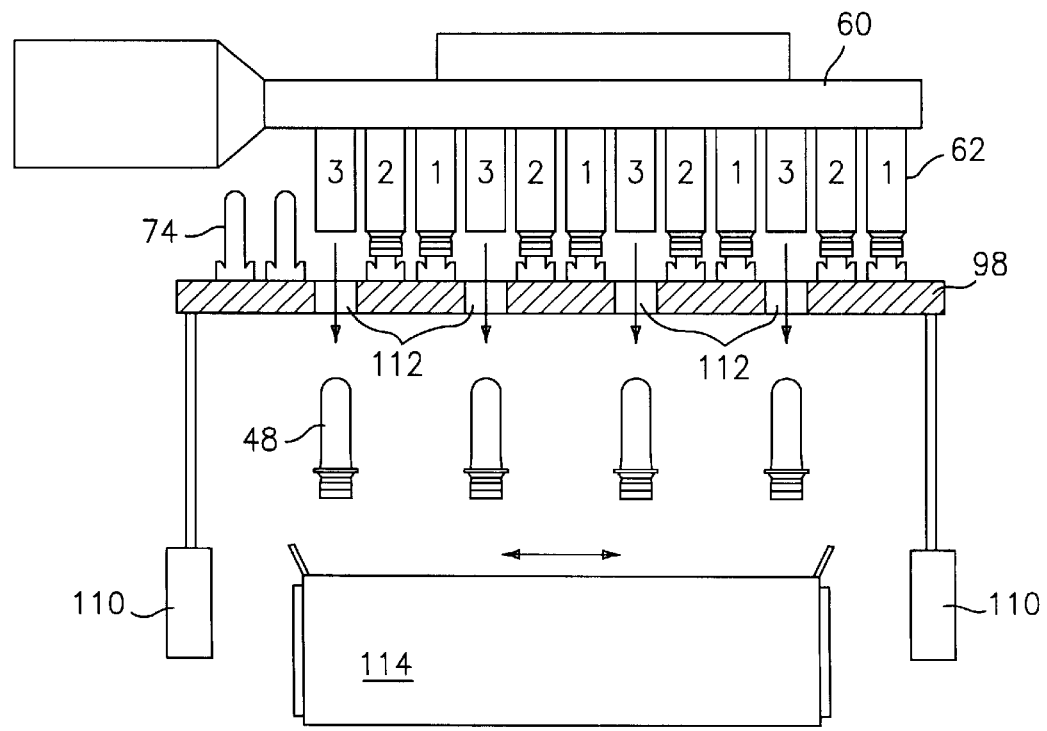

Referring now to FIGS. 6 and 7, an array of cooling pins 74 is mounted onto a cooling frame 98 which can be made of a lightweight material such as aluminum. The cooling pins 74 can have any of the configurations previously discussed. For example, the cooling pins 74 could be the cooling pins 74 with flexible fins 412 shown in FIGS. 9(c)–9(e). According to the present invention, the cooling frame 98 can be operated in either a vertical or a horizontal position. In both cases, the frame 98 is movable towards the take-off plate 60 when the take-off plate 60 reaches its final out of mold position. Any suitable means known in the art may be used to move the frame 98 so as to advance it at a high speed so that the cooling pins 74 can be immediately introduced inside the molded article. In a preferred embodiment of the present invention, the frame 98 is moved using hydraulic cylinders 110. According to the present invention, the number of cooling pins 74 can be the same or less than the number of receptacles 62 in the take-off plate 60. According to the present invention, the take-off plate 60 is provided with means for holding the molded articles 48 within the receptacles 62 such as suction means (not shown), and with means for ejecting the molded articles from the take-off plate. The holding means and the ejection means may be those disclosed in the aforementioned U.S. Pat. No. 5,447,426 which has been incorporated by reference herein. As shown in FIGS. 6(c) and 6(d), the cooling frame 98 may be provided with a plurality of spaces 112. The spaces 112 may be used to allow finally cooled molded articles ejected from the take-off plate 60 to be dropped onto a conveyor 114 for transportation away from the system. The fully cooled molded articles 48 may be dropped onto the conveyor 114 through the spaces 112 by laterally shifting the cooling pins 74 relative to the receptacles 62 holding the molded articles that have to be ejected from the take-off-plate 60. This is the case when the cooling frame is in a horizontal position. When the cooling frame is in a vertical position, it does not interfere with the molded articles dropped by the take-off-plate.

Figure 7A:
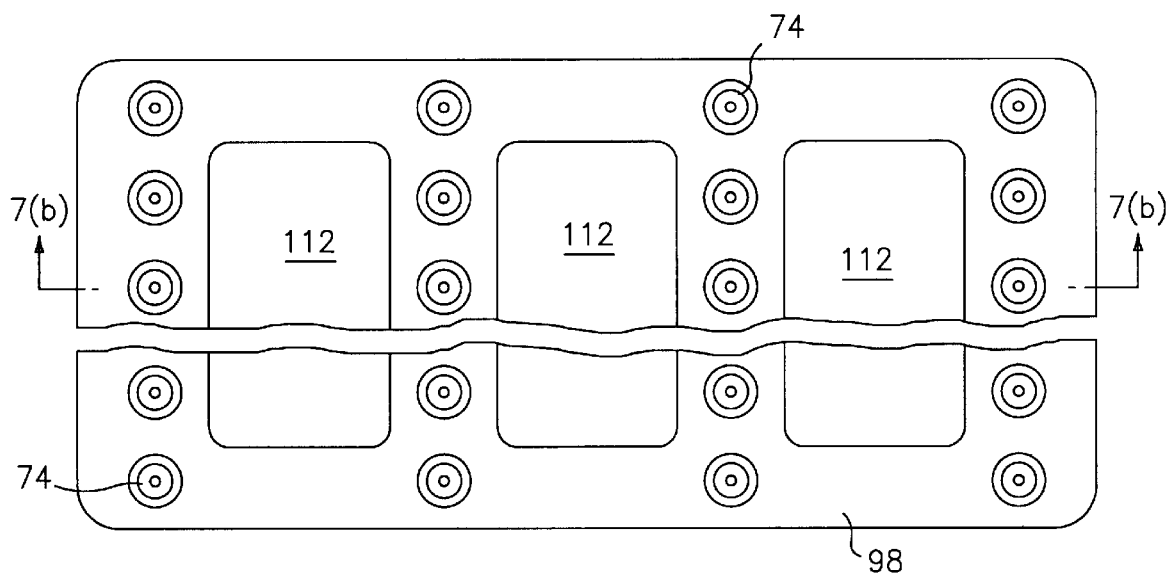
FIGS. 7(a)–7(d) shows the frame and the cooling pins according to a first embodiment of the present invention.
Figure 7B:
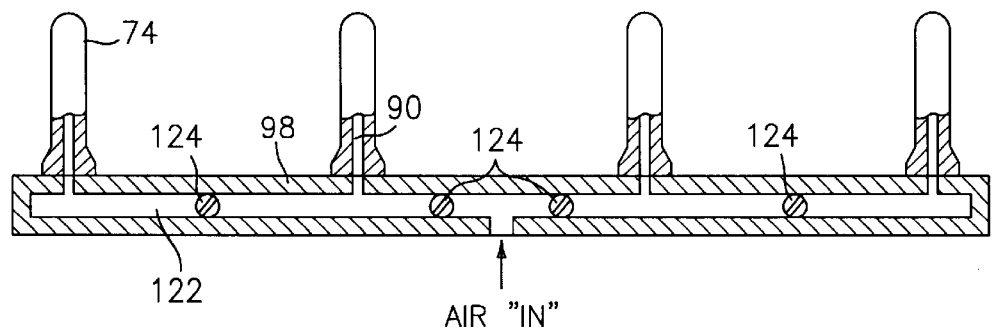

Referring now to FIGS. 7(a) and 7(b), a first array of cooling pins 74 is illustrated. The cooling pins 74 could be of the type shown in FIGS. 9(c)–9(e). As can be seen in FIG. 7(b), the cooling air passageways 90 or channels 404 communicate with a source of cooling air or other cooling fluid (not shown) via the passageway 122. Incorporated into the passageway 122 are a number of air valves 124. which can be used to regulate the flow of the cooling air or fluid. In this way, variable amounts. of cooling air or fluid can be supplied to the cooling pins 74.

Figure 7C:
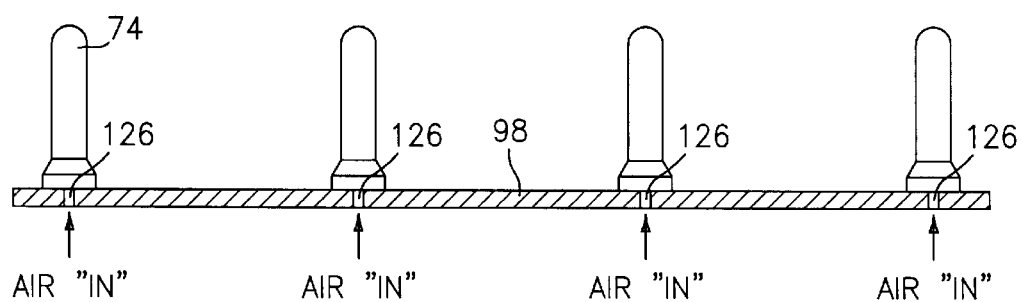
Figure 7D:
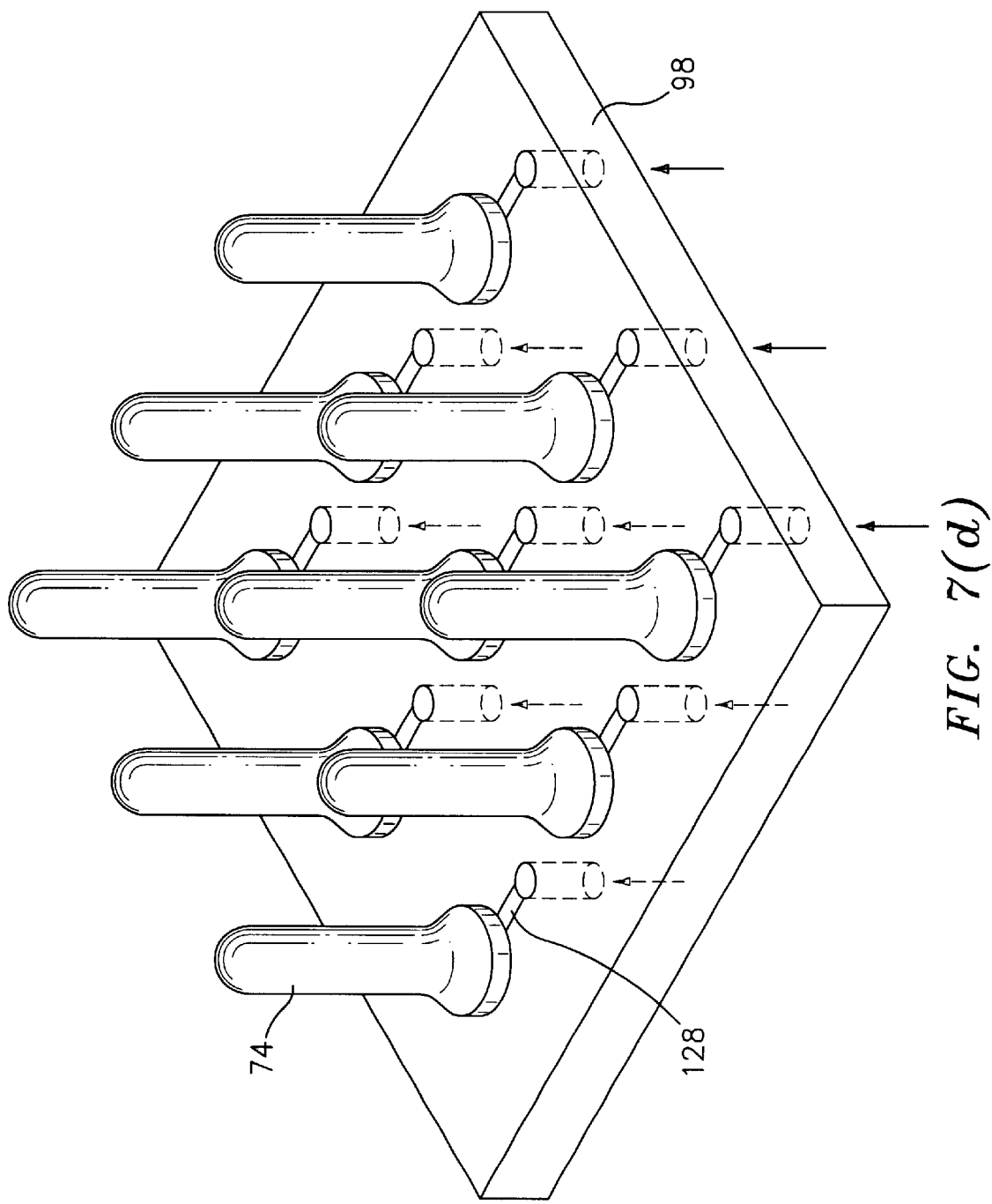

Referring now to FIG. 7(c), it is also possible to directly provide each cooling pin 74 with a cooling fluid from a source of cooling fluid (not shown) via a simple passageway 126. Still further, as shown in FIG. 7(d), if desired, the passageway 126 could be connected to the fluid conduit 120 in each of the cooling pins via a flexible conduit 128.

According to one embodiment of the present invention, the cooling pins 74 enter the molded articles retained by the take-off plate 60 in a few steps, and at each step the molded articles that are molded at different times are at different temperatures. In order to optimize the overall cooling step and to avoid the waste of coolant, during the first step of cooling the molded articles are very hot and thus a maximum amount of cooling air is delivered by the pins. In the second and the subsequent steps, the amount of cooling fluid directed by the pins engaging the first molded articles is substantially less than the amount directed towards the newly molded and hotter articles. In order to further optimize the cooling process, any known suitable temperature sensors, such as thermocouples, can be used to measure the temperature of the articles before and after cooling them so that adjustments of the cooling rate can be done without interrupting the molding cycle. In a preferred embodiment, thermocouples (not shown) connected to some cooling control means (not shown) are located in the take-off plate 60 adjacent to each article. By monitoring the temperature of each article, some adjustments can be made to the amount of cooling fluid delivered to all cooling pins 74 or to some of the cooling pins 74. This may also compensate for any cooling inefficiencies or non-uniformity of the conduction cooling means located in the take-off plate.

Figure 10A:
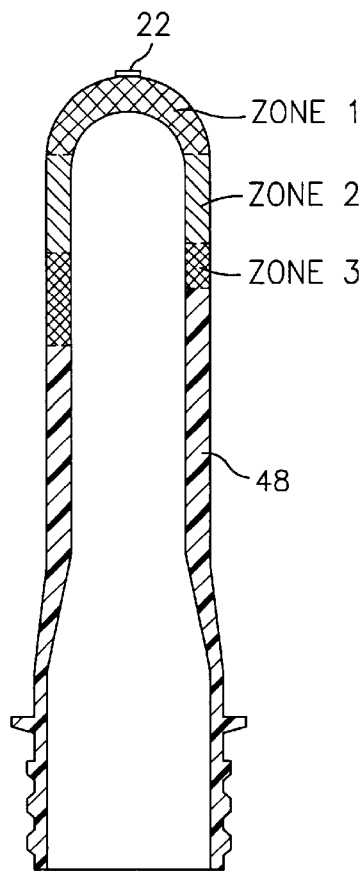
FIG. 10(a) shows a molded article having crystallized zones as they are generated in prior art methods.
Figure 10B:
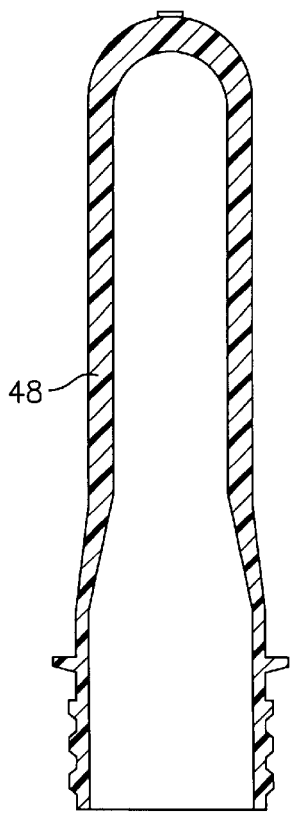
FIG. 10(b) shows a molded article without crystallized zones as it results after the method of the present invention.

Referring now to FIGS. 10(a) and 10(b), FIG. 10(a) shows a molded article 48, in sectional view, molded by a prior art system. As shown therein, the molded article 48 may have crystalline areas in four different zones including the dome portion 22 and the neck portion 13. FIG. 10(b) on the other hand shows a molded article 48, in section view, which has been manufactured using the system of the present invention. As shown therein, there are no areas of crystallinity.

Figure 11C:
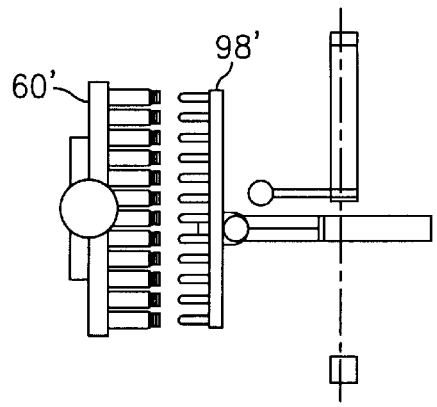
Figure 11D:
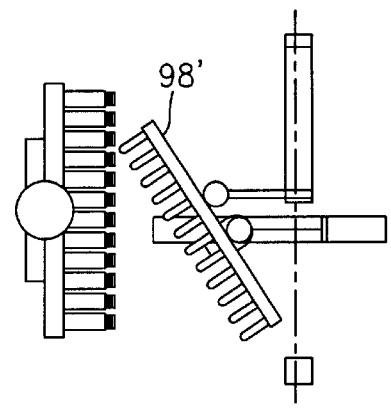
Figure 11E:
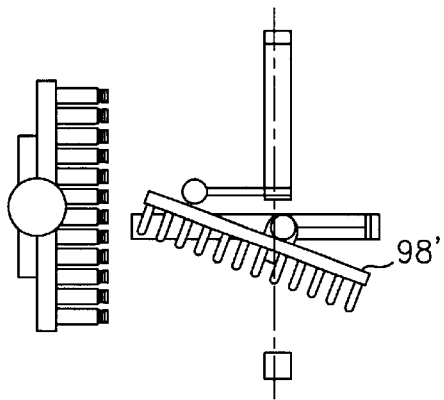
Figure 11F:
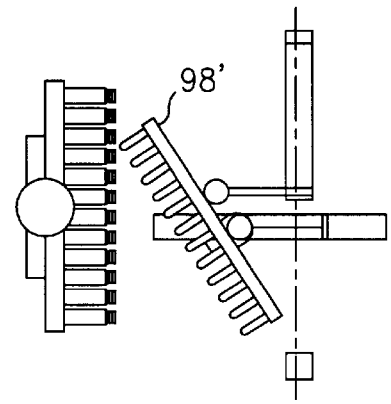
Figure 11G:
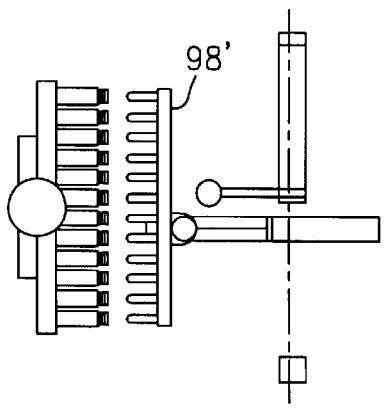
Figure 11H:
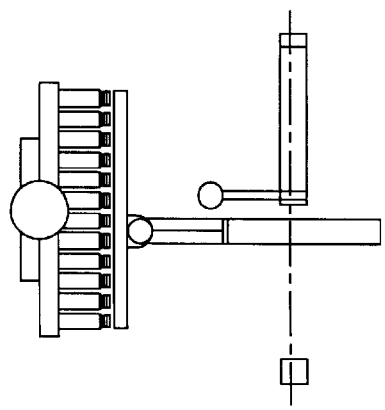
Figure 11I:
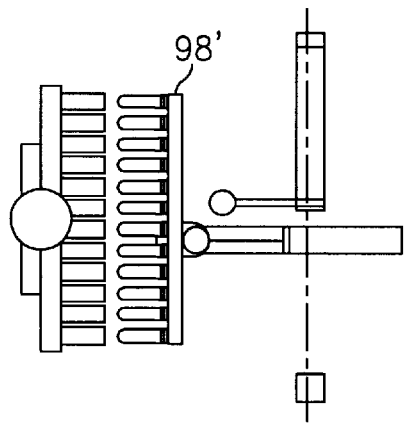
Figure 11J:
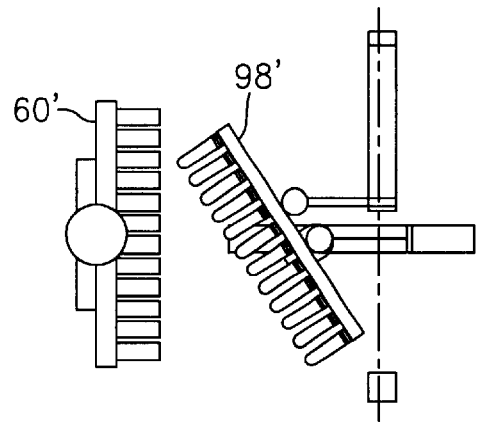
Figure 11K:
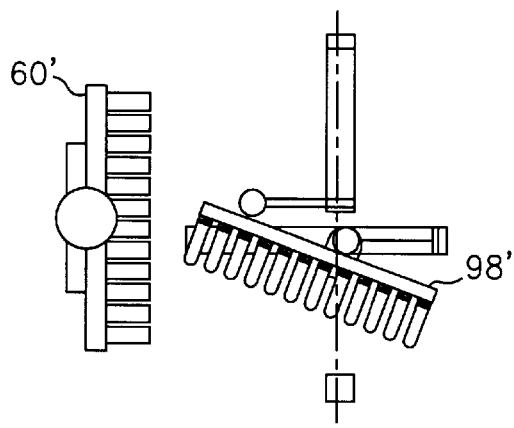
Figure 11L:
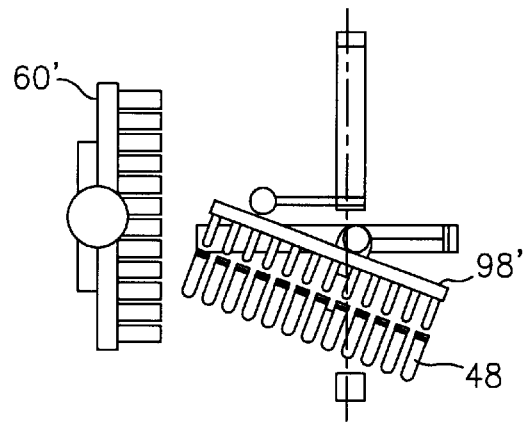

Another embodiment of the present invention is shown in FIGS. 11(a) through 11(l) where the take-off plate 60' is always maintained in a vertical position during the entire molding cycle. This eliminates a complicated motor and makes it lighter and thus faster to move in and out of the mold space formed between the mold halves or mold plates 32 and 36. The cooling frame 98' used in this system has an additional function and an additional movement. First of all, the pins 74' use blowing air to cool the molded articles and sucking air to extract the molded articles from the take-off plate 60'. The articles are held on the pins 74' by the vacuum and removed from the tubes 62' within the take-off plate 60' during a back movement. The cooling frame 98' has a movement to approach and move back from the take-off-plate 60' and further has a rotation to move from a vertical to a horizontal position parallel to a conveyor 114' to allow the molded articles to be ejected from the pins 74' by stopping the vacuum. According to the present invention, any suitable means known in the art can be used to rotate the cooling frame 98' with the pins 74'. According to a preferred embodiment of the invention shown in FIGS. 11(a) through 11(l), a stationary cam 130 is used as a very simple means to convert the translation of the frame into a rotation so that the molded articles held by the cooling frame can be dropped onto a conveyor 114'. As shown in FIG. 11(h), the cooling pins 74' can engage the molded articles by vacuum and remove them from the take-off plate 60'. Next the molded articles are dropped from the pins 741 onto a conveyor.

The cooling pins 74' can have a construction such as in FIGS. 9(c)–9(e). In this situation, the central channel 404 may be connected to a vacuum source as well as a cooling fluid source. Valve means can be provided between the channel 404 and the cooling fluid source and the vacuum source.

The operation of the innovative cooling apparatus of the present invention can be understood from FIGS. 6(a) through 6(d). After the in-mold cooling process which is shortened up to the point where the articles reach a solidification status that prevents their deformation, the mold is opened and the take-off plate 60 is moved into the molding area between the mold core plate 36 and the mold cavity plate 32. Relative movement between the mold core and mold cavity plates may be performed in any manner known in the art using any suitable means (not shown) known in the art. After the take-off plate 60 reaches the out of the mold position, the cooling pins 74 are engaged with the molded articles for cooling, especially in the dome area 22 of each article.

While the take-off plate 60 has been described as having water cooled means for conduction cooling of the exterior surfaces of the molded articles within the holders 62, there are times when one would want to not start cooling of the exterior surfaces when the molded articles are first placed within the take-off plate. To this end, means may be provided to control cooling within the take-off plate so that such cooling does not start until after internal cooling of the molded articles has begun and/or finished. For example, suitable valve means (not shown) may be incorporated into the take-off plate to prevent flow of a cooling fluid until a desired point in time.. In this way, internal and external cooling of .the molded article may be preformed simultaneously, at least partially simultaneously, or sequentially.

Figure 16:
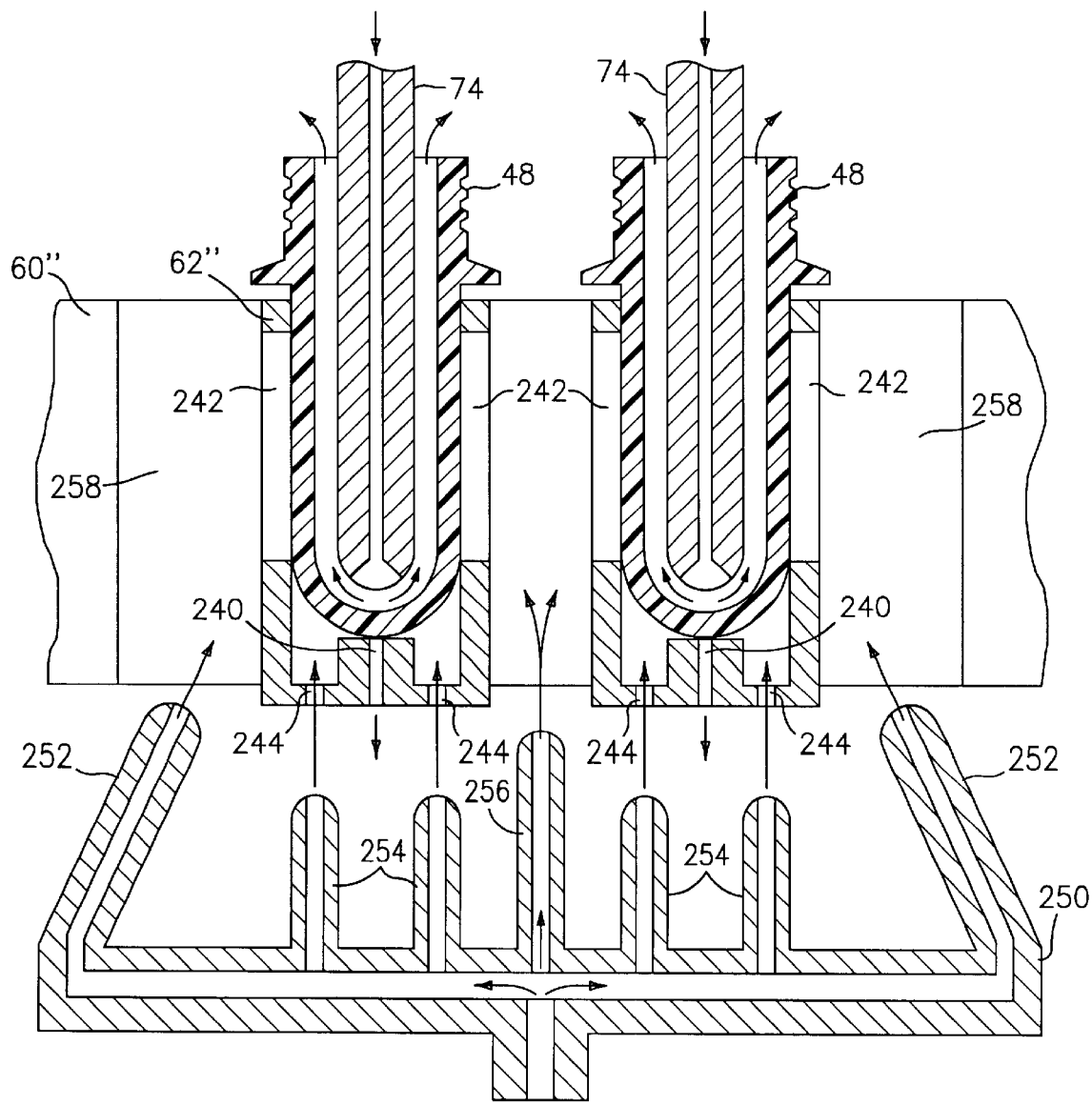
FIG. 16 illustrates an embodiment of the present invention wherein a take-off plate with no cooling means is used to remove the molded article from the molding area.
Figure 19:
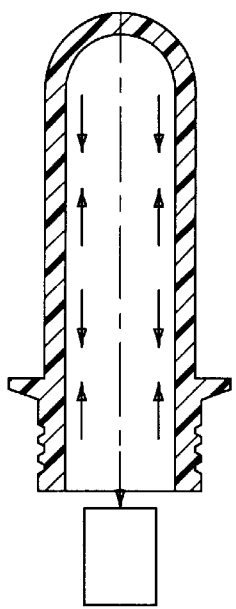
FIGS. 19 and 20 illustrate prior art methods for cooling the interior of a preform.
Figure 20:
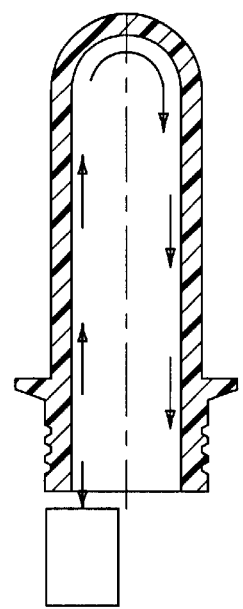
Figure 21:
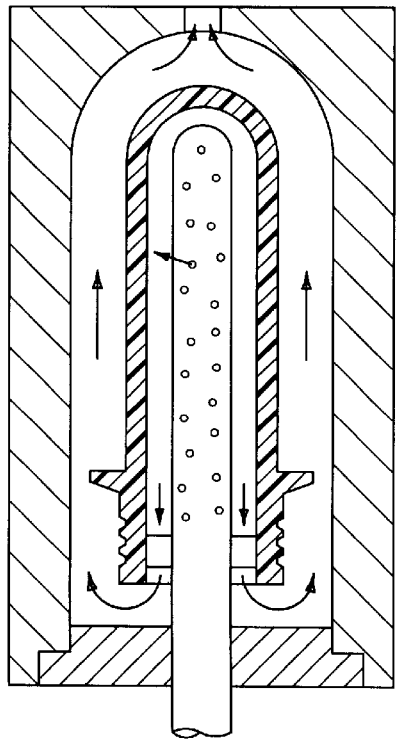
FIG. 21 illustrates another prior art system for cooling the interior and the exterior of a preform.
Figure 22:
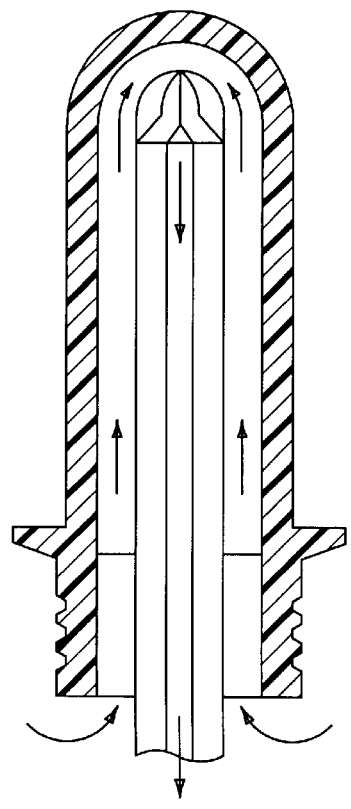
FIG. 22 illustrates a prior art system using the sucking of ambient air to cool a preform.

FIG. 16 illustrates another embodiment wherein a take-off plate 60" with no cooling means is used to remove the molded articles from the molding area. The take-off plate 60" may have article holders 62" sufficient in number to accommodate either a single batch or multiple batches of molded articles. The molded articles are retained by vacuum means (not shown) that through the openings 240 suck on the sprue gate or dome portion 22 of the molded articles 48. The molded articles are also retained by the holders 62" which can have any desired configuration that allows the molded articles to be directly cooled using a cooling gas/air. The holders 62" are preferably stiff enough to retain the molded articles and have perforations or other openings 242 and 244 where the holders do not have any direct contact with the molded articles. By having these kind of holders that only partially cover the outer surface of the molded articles, the molded articles can be cooled on their outer surfaces, while they are additionally cooled internally by the cooling pins 74. In this case,. the cooling step comprises the transfer of the molded articles from the mold to the take-off plate 60", the movement of the take-off plate 60" outside the molding area, to the cooling area which is adjacent the molding area. At the cooling area, the molded articles 48 are internally cooled using the frame 98 and the cooling pins 74 that enter at least partially inside the molded articles. At the same time, the molded articles 48 retained. by the take-off plate 60" have their exterior surfaces convectively cooled by an additional cooling station 250 that blows a coolant fluid towards the article holders. As shown in FIG. 16, the additional cooling station 250 has a plurality of nozzles 252, 254, and 256 for blowing coolant toward the outer surfaces of the molded articles. The nozzles 252, 254, and 256 blow cooling fluid through windows 258 in the take-off plate 60" and onto the outer surface of the molded articles via windows or openings 242 and 244 in the article holders. The nozzles 252, 254 and 256 blow cooling fluid through openings 242 and 244 in the article holders 62" and onto the outer surface of the molded articles. While the additional cooling station 250 has been shown as having nozzles for cooling two molded articles, it should be recognized that in actuality the cooling station 250 may have as many nozzles as needed to cool the outer surfaces of any desired number of molded articles.

The use of the additional cooling station 250 allows the molded articles 48 to be simultaneously cooled inside and out using cooling means that are independent from the take-off plate 60". This approach makes the take-off plate 60" very light, very fast and easy to service. If desired, the article holders 62" may grip the molded articles solely around the neck portion, thus leaving a more open window for the blown cooling fluid to cool the outer portion of the molded articles.

According to another embodiment of. the invention, the take-off plate may include external cooling means using blown air or may include no cooling means. In both cases, internal cooling is achieved using the novel cooling method and apparatus of the present invention.

The innovative cooling method and apparatus of the present invention are extremely beneficial for cooling articles molded in high cavitation molds. It is well known that the temperature of the molten resin flowing through a mold varies quite substantially for a various of reasons including: (a) non-uniform heating of the hot runner manifold; (b) formation of boundary layers inside the manifold's melt channels; (c) non-uniform mold cavity cooling; and (d) insufficient cooling at the mold gate area. One consequence of the temperature variations across the mold is that the cooling time has to be adjusted at the local level so that the hottest articles are cooled before any crystallinity occurs in the final articles. In order to prevent formation of crystallized zones, the cooling system of the present invention is able to provide a different cooling pattern that can be tuned according to the temperature signature of each mold. Sensors in the take off plate 60 can be provided to regulate the amount of cooling from each cooling pin 74. Another consequence of the non-uniform temperature inside the mold is that in most cases the gate sprue area located on the dome section 22 of the articles is the hottest part of the molded article. Because this sprue gate portion is slower cooled in the mold closed position, chances are that this portion will be highly crystalline if the in-mold cooling is too long or if no additional cooling is provided outside the mold. According to the present invention, the cooling pins 74 blowing cold air inside the molded article immediately adjacent the sprue gate area is a novel operation that prevents in a very efficient manner the formation of crystallized areas in the molded article.

The innovative cooling method and apparatus of the present invention are also beneficial for compensating for the cooling inefficiency of the take-off plate. It may happen that due to the imperfect contact between the hot molded article and the cooling tube, the temperature of the molded article held by the take-off plate may vary across the plate. According to the present invention, the temperature sensors located in the take-off plate or the cooling frame can be used to provide information to a cooling control unit that varies the amount of cooling fluid directed to each article.

The adaptive cooling approach mentioned so far is also beneficial because it can take into account the fact that the temperature pattern of the molded articles can vary during the day, the function of the specific resin used, the function of the machine settings, or due to local variations in the thickness of the articles caused by improper valve stem actuation in the hot runner nozzle or due to uneven core shift in the mold cavities. These situations are neither predictable nor easy to fix; however, the present invention provides a mechanism to tune the post-molding cooling step for each cavity based on the temperature of each molded article.

A significant reduction of the cycle time for the benefit of increasing the post molding cooling time can be achieved by simplifying the design and the movements of the take-off plate and the cooling frame. This has to take into account very critical assembling, servicing and operation constraints such as rigidity, movement accuracy, alignment between the cooling pins and the molded articles on the take-off-plate and vibrations. Also the location of the cooling frame with the pins has to be decided in such a manner to reduce the "foot print" of the entire machine.

Reference is made in this regard to FIGS. 13(a) and 13(b) which show another embodiment of the present invention where the take-off plate 60 remains in a vertical position during the additional air cooling step, i.e. parallel to the mold plates 32, 26. The cooling frame 98 is translated towards the take-off plate 60 and the cooling pins 74 enter the molded articles 48. After all the molded articles are cooled, the cooling frame 98 is retracted, the take-off plate 60 is rotated at 900 and parallel to a conveyor 114 and then the cooled articles are removed from the plate 60. This approach simplifies the design of the cooling frame which does not need rotation means and means to prevent its interference with the articles ejected from the plate.

Further reference is made to FIG. 14 which shows another embodiment of the invention where the robot take-off plate 60 comprises additional translation means 150 to move the molded articles 48 along an axis parallel to their axis of revolution. This additional movement of the molded articles 48 simplifies the cooling frame 98 which remains substantially stationary during the cooling process. As shown in FIG. 14, the take-off plate 60 or other means for holding the molded articles is translated along the axis X towards the stationary cooling frame 98. After the cooling step, the take-off plate 60 is rotated by 90° so that it faces the conveyor 114 and thus the cooled articles are ejected.

Figure 15:
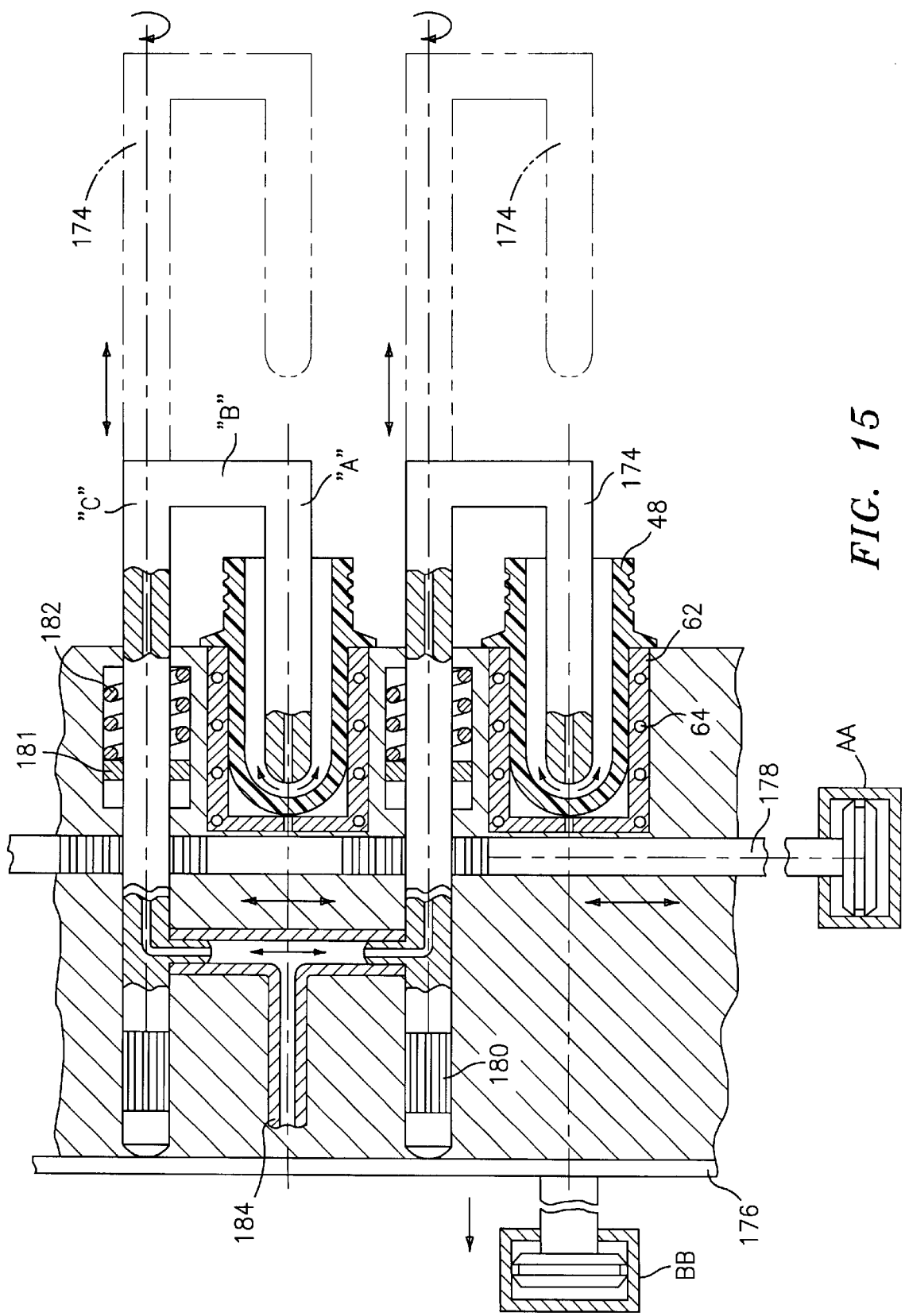
FIG. 15 is a sectional view of yet another embodiment of the cooling system of the present invention showing the mechanism for cooling the interior of the molded articles attached to the take-off-plate.

Further reference is made to FIG. 15 which shows novel air cooling means attached to the take-off-plate 60. The approach shown in this figure eliminates the need for a separate frame for holding the cooling pins and thus reduces the size of the cooling system and thus of the injection molding machine. The new cooling pins 174 have an approximate U-shape and can be moved all together parallel to the molded articles 48 so that they can be introduced inside the molded articles and moved out of the molded articles using a thin strip 176 actuated by piston BB or any other known means. The pins 174 can be also rotated around an axis "A" parallel to the article so that they can be brought into or removed from axial alignment with the article. This simultaneous rotation of all the pins 174 can be achieved using any suitable means known in the art. According to the invention, the U-shaped cooling pins 174 have an ARM "A" that enters the molded article, an ARM "C" parallel to ARM "A" that is used for moving ARM "A", and an ARM "B" that connects ARM "A" to ARM "C". The rotation of the pins around the axis A of ARM "C" can be done in various ways. As shown in FIG. 15, this can be done using an elongated rack 178, operated by piston AA, that is in engagement with pinions 180 attached to the ARM "C" of each cooling pin. The same rotation can be done using frictional means, one in translation and the other in rotation. During the transfer of the molded articles 48 from the cores 38 to the cooling tubes 62 of the take off plate 60, the U-shaped cooling pins 174 can be "parked" in a dedicated location located adjacent each cooling tube 62, so that they do not interfere with the moving articles and less space is needed to open the mold. Immediately after the molded articles 98 are retained in the take-off plate 60, the cooling pins 174 attached to the plate 60 are moved forward by the piston BB and the strip 176 and when they reach a certain height which allows ARM "A" to be on top of the molded article, they are rotated in axial alignment with the articles and finally introduced inside the molded articles through the retreat of the piston BB. The permanent contact between the strip 176 and each ARM "C" is provided by a coil spring 182 which operates against shoulder 181 or any other appropriate means. A flexible tube 184 is used to supply blowing air to each cooling pin through ARM "C". This design of the cooling pins attached to the take-off plate brings the following advantages: simplifies and reduces the size of the cooling system, improves the cooling rate because inside cooling starts immediately after the molded articles are in the take-off plate, inside cooling can be done during the movement of the take-off plate and practically continuously for as long as the molded articles are also cooled by the take-off plate. During the ejection of the cooled articles, the cooling pins must be again rotated towards their initial position so that they are no longer aligned with the articles.

Figure 12:
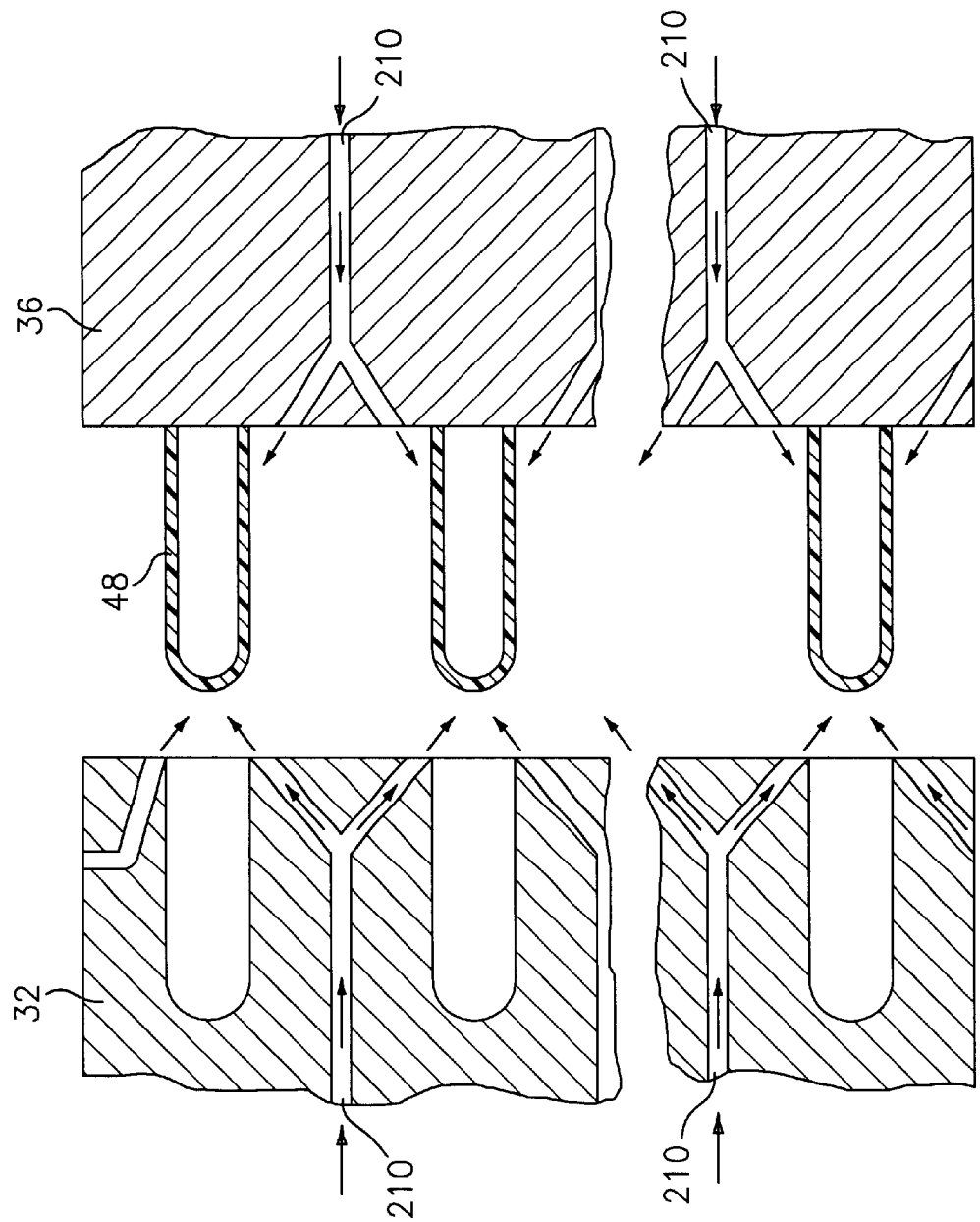
FIG. 12 is a sectional view of a system wherein air cooling channels are incorporated into the mold halves.

Further reference is made to FIG. 12 which shows air cooling means comprising cooling channels 210 incorporated in the mold halves 32, 36 that allow cooling of the molded articles held by the mold cores, during and immediately after opening the mold and before the take-off plate enters the molding area. This additional cooling step will further solidify the molded articles before the take-off plate is brought into the mold area and before they are transferred to the take-off plate.

According to another embodiment of the present invention, that can be easily understood from other drawings in this. application, the robot and the take-off plate retain only a single batch of molded articles. After the injection steps, the take-off plate is parked outside the mold area and cooling air or refrigerated air is blown inside each molded article from the cooling pins. The cooled articles are ejected form the take-off plate that will be brought back into the molding area without carrying any molded articles.

Figure 23:
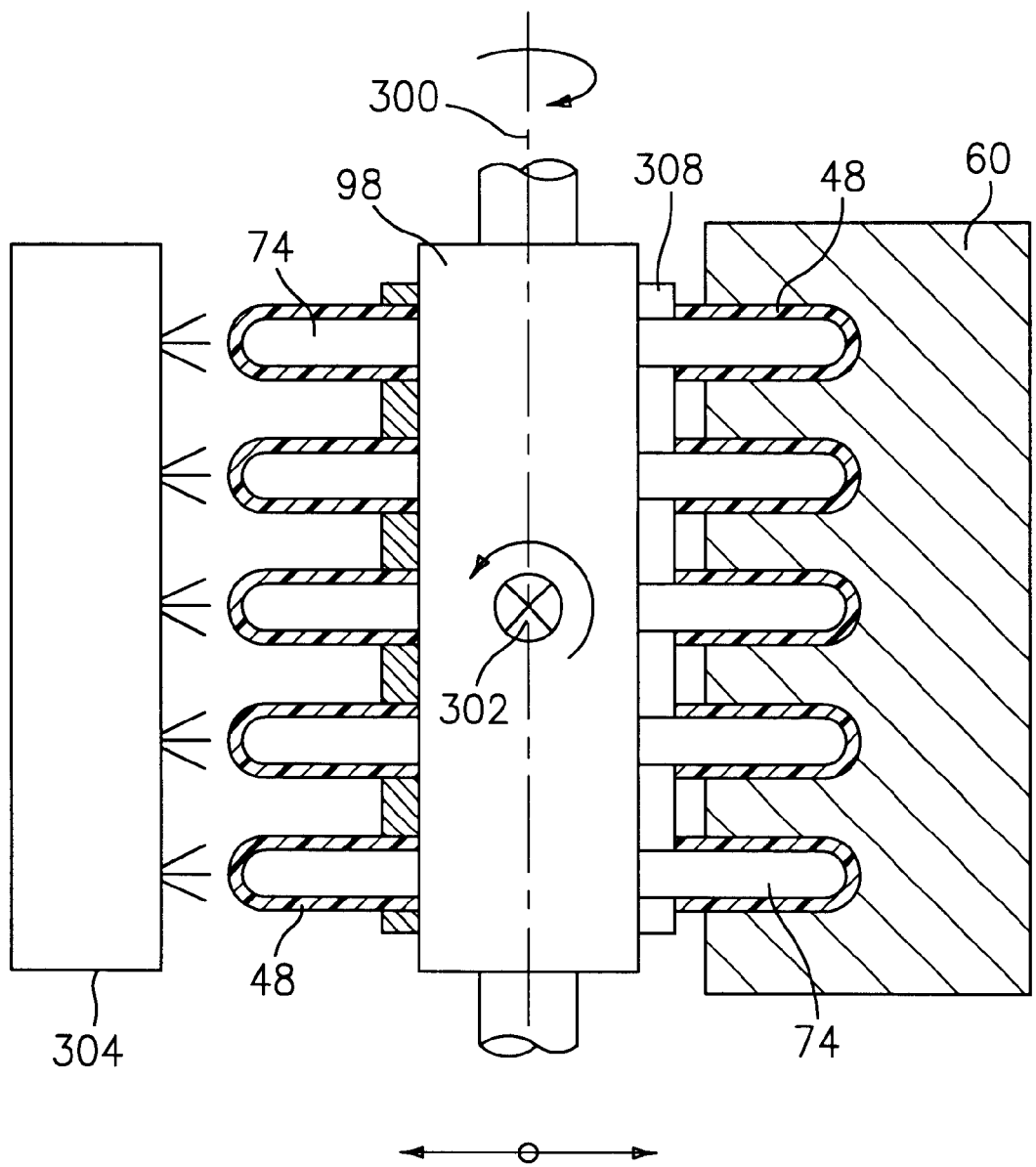
FIG. 23 illustrates an alternative frame construction with cooling pins on multiple surfaces of the frame.

FIG. 23 illustrates an alternative construction of the frame 98 for holding the cooling pins 74. As shown in this figure, the frame 98 may have cooling pins 74 on two opposed surfaces. Further, the frame may rotate about a first axis 300 and a second axis 302 which is perpendicular to the first axis 300. Any suitable means (not shown) known in the art may be used to rotate the frame 98 about the axes 300 and 302.

By providing this type of construction, it is possible to have a first set of cooling pins 74 engage the molded articles 48 in a take-off plate 60 and begin internal cooling of the molded articles. The molded articles 48 may then be transferred out of the holders 62 in the take-off plate 60 onto the pins 74. The frame 98 can then be rotated about one or more of the axes 300 and 302, while internal cooling of the molded articles 48 is being carried out by the pins 74. After the first set of molded articles has reached the left-hand position shown in FIG. 23, a second set of cooling pins 74 may engage a second set of molded articles 48 held in the take-off plate 60. If desired, the left-hand set of molded articles 48 can have their exterior surfaces convectively cooled using a cooling station 304 having a plurality of nozzles (not shown) for blowing cold air onto the exterior surfaces. If desired, the frame 98 may have an article retaining plate 308 attached to it.

It is apparent that there has been provided in accordance with the present invention a post-mold cooling method and apparatus which fully satisfies the means, objects, and advantages set forth hereinbefore. It is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for cooling a molded article comprising:
   positioning said molded article within a receptacle;
   providing a cooling pin with a central pin structure, a cooling fluid channel with an outlet in said central pin structure, and a plurality of fins positioned along said central pin structure;
   introducing said cooling pin within an interior of said molded article; and
   introducing a cooling fluid into the interior of said molded article via said cooling fluid channel and said outlet and forcing and maintaining said cooling fluid in close proximity to interior surfaces of said molded article with said fins.

2. A method according to claim 1, wherein said cooling pin introducing step comprises introducing said cooling pin deeply within said article so that said cooling fluid exiting said outlet impinges on a dome portion of said molded article.

3. A method according to claim 1, wherein each of said fins is formed by a flexible material and is allowed to flex as said cooling fluid passes along said interior surfaces of said molded article.

4. A method according to claim 1, further comprising:
said positioning step comprising removing said molded article from a mold with a carrier having said receptacle and transporting said molded article to a cooling position;
said cooling pin providing step comprises providing said cooling pin on a movable frame; and
said cooling pin introducing step comprises moving said frame relative to said carrier to introduce said cooling pin deeply within the interior of said molded article.

5. A method according to claim 4, further comprising:
connecting said cooling pin to a vacuum source; and
applying a vacuum force to the interior of said molded article to remove said molded article from said carrier and to transport said molded article to a remote location.

6. A method according to claim 1, further comprising cooling exterior surfaces of said molded article.

7. A method according to claim 6, wherein said exterior surface cooling is performed simultaneously with said cooling fluid introducing step.

8. A method according to claim 6, wherein said exterior surface cooling is performed sequentially with said cooling fluid introducing step.

9. A method according to claim 6, wherein said exterior surface cooling is performed using heat convection.

10. A method according to claim 6, wherein said exterior surface cooling is performed using heat conduction.

11. A method according to claim 1, wherein the interior surfaces of said molded article are spaced from said fins and said outlet during the introduction of said cooling fluid into said molded article.

12. A method for cooling a plurality of molded articles comprising:
removing a plurality of molded articles from a mold using a carrier and transporting said molded articles to a cooling position;
providing a frame having a plurality of cooling pins mounted thereto with each of said cooling pins having a central pin structure, a cooling fluid channel with an outlet in said central pin structure, and a plurality of flexible fins positioned along the central pin structure;
introducing said cooling pins into the interiors of said molded articles by moving said frame relative to said carrier; and
cooling the interiors of said molded articles by introducing a cooling fluid into the interior of each molded article via the cooling fluid channel and outlet of a respective cooling pin and forcing and maintaining the cooling fluid in close proximity to interior surfaces of the molded article with said flexible fins.

13. A method according to claim 12, wherein said introducing step comprises introducing said cooling pins deeply into the interior of said molded articles so that cooling fluid impinges directly on a dome portion of each molded article.

14. A method according to claim 13, wherein said cooling fluid introducing step substantially prevents crystallization in said dome portion.

15. A method according to claim 13, further comprising cooling exterior surfaces of said molded articles.

16. A cooling pin for cooling a molded article, which cooling pin comprises:
a central pin structure terminating in a head portion;
a fluid channel in said central pin structure terminating in an outlet in said head portion for causing a cooling fluid to be introduced into the interior of the molded article; and
a plurality of fins positioned along said central pin structure for causing cooling fluid flowing in said molded article to be in close proximity to interior surfaces of the molded article.

17. A cooling pin according to claim 16, wherein each of said fins is formed from a flexible material.

18. A cooling pin according to claim 16, wherein each of said fins is formed from a flexible plastic material.

19. A cooling pin according to claim 16, wherein each of said fins is formed by an annular ring.

20. A cooling pin according to claim 19, wherein said annular ring has a central hole which allows a respective fin to be slid along an exterior surface of said central pin structure.

21. A cooling pin according to claim 16, further comprising a spacer positioned between adjacent ones of said fins.

22. A cooling pin according to claim 16, wherein said plurality of fins includes a first set of fins having a first diameter and a second set of fins having a second diameter greater than said first diameter.

23. A cooling pin according to claim 16, wherein said fluid channel has an inlet for communicating with a source of cooling fluid.

24. A cooling pin according to claim 16, wherein said head portion has an undercut surface and at least one of said fins is positioned substantially adjacent to said undercut surface.

25. A cooling pin according to claim 16, wherein said fluid channel is connected to, a vacuum source whereby said cooling pin is used to unload said molded article from a holder.

26. A system for cooling molded articles comprising:
a carrier for removing at least one molded article from a mold and for transporting said at least one molded article to a cooling position; and
at least one cooling pin for insertion into the interior of said at least one molded article, said at least one cooling pin having a central pin structure and a plurality of fins positioned about an exterior surface of said central pin structure.

27. A system according to claim 26, further comprising:
said at least one cooling pin being mounted to a frame and;
said frame moving relative to said carrier for inserting said at least one cooling pin within said at least one molded article.

28. A system according to claim 27, wherein said carrier has a plurality of receptacles for removing a plurality of molded articles from said mold and wherein said frame has a plurality of said cooling pins mounted thereto.

29. A system according to claim 26, wherein said central pin structure has an internal channel for conducting a cooling fluid into the interior of the at least one molded article and wherein said fins are formed by flexible members which force and maintain said cooling fluid in close proximity to interior surfaces of said at least one molded article.

30. A system according to claim 29, wherein said channel has an inlet which communicates with a source of cooling fluid and an outlet in close proximity to a dome portion of the at least one molded article for causing said cooling fluid to impinge directly on said dome portion.

31. A system according to claim 29, wherein adjacent ones of said fins are separated by a spacer.

32. A system according to claim 26, wherein said fins are formed by a flexible plastic material.

33. A system according to claim 26, wherein said fins are formed by annular shaped members.

34. A system according to claim 26, wherein said fins have different outer dimensions to conform with an interior configuration of said at least one molded article.

35. A system according to claim 26, further comprising a mold for forming said at least one molded article.

36. A system according to claim 26, wherein said at least one cooling pin has a central axis substantially aligned with a central axis of said at least one molded article.

37. A system according to claim 26, further comprising means for cooling exterior surfaces of said at least one molded article.

38. A system according to claim 37, wherein said exterior surface cooling means is incorporated into said carrier.

39. A system according to claim 38, wherein said exterior cooling means comprises a water-cooled tube within said carrier.

40. A system according to claim 26, further comprising said at least one cooling pin communicating with a vacuum source whereby said at least one cooling pin removes said at least one molded article from said carrier and transports said at least one molded article.

* * * * *